US012011772B2

(12) United States Patent
Andersson et al.

(10) Patent No.: US 12,011,772 B2
(45) Date of Patent: Jun. 18, 2024

(54) CUTTING INSERT AND MILLING TOOL

(71) Applicant: SECO TOOLS AB, Fagersta (SE)

(72) Inventors: Johan Andersson, Norberg (SE); Stefan Hedberg, Hedemora (SE); Kenneth Enlund, Fagersta (SE); Fredrik Kantojarvi, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 520 days.

(21) Appl. No.: 17/047,820

(22) PCT Filed: Apr. 10, 2019

(86) PCT No.: PCT/EP2019/059008
§ 371 (c)(1),
(2) Date: Oct. 15, 2020

(87) PCT Pub. No.: WO2019/201686
PCT Pub. Date: Oct. 24, 2019

(65) Prior Publication Data
US 2021/0362250 A1    Nov. 25, 2021

(30) Foreign Application Priority Data

Apr. 16, 2018 (EP) ..................................... 18167558

(51) Int. Cl.
*B23C 5/20* (2006.01)
(52) U.S. Cl.
CPC .................................... *B23C 5/202* (2013.01)
(58) Field of Classification Search
CPC .......... B23C 2200/24; B23C 2200/246; B23C 2200/281; B23C 2200/208;
(Continued)

(56) References Cited

U.S. PATENT DOCUMENTS

| 8,979,440 B2 | 3/2015 | Ishi |
| 2012/0009029 A1 | 1/2012 | Saji |

(Continued)

FOREIGN PATENT DOCUMENTS

| EP | 3000548 A1 * | 3/2016 | ............... B23C 5/06 |
| EP | 3072616 A1 | 9/2016 | |

(Continued)

OTHER PUBLICATIONS

WO 2012/046556 Cutting Insert and Cutting Tool, and Method for Manufacturing Cut Product Using Same, Machine Translation Apr. 12, 2012 (Year: 2012).*

*Primary Examiner* — Alan Snyder
(74) *Attorney, Agent, or Firm* — Corinne R. Gorski

(57) ABSTRACT

A cutting insert for a milling tool is provided. A longitudinal plane extends halfway between a first pair of opposing side surfaces of the cutting insert. A first axial relief face adjacent to the a auxiliary cutting edge and a first axial abutment face form part of a first surface grouping on a first side of the longitudinal plane, and a second axial relief face adjacent to a second auxiliary cutting edge and a second axial abutment face form part of a second surface grouping on a second side of the longitudinal plane. The first surface grouping and the second surface grouping meet in a partitioning line, wherein the partitioning line extends in the longitudinal plane, and wherein the partitioning line extends from the first side to the second side.

22 Claims, 8 Drawing Sheets

(58) Field of Classification Search
CPC ...... B23C 2200/125; B23C 2200/0438; B23C 2200/369; B23C 2200/0427; B23C 2200/0422; B23C 2200/123; B23C 2200/203; B23C 2200/243; B23C 2200/291; B23C 2200/289; B23C 2200/284; B23C 2200/283; B23C 2200/28; B23C 2200/201; B23C 2200/205; B23C 2200/0494; B23C 2200/0433; B23C 5/202

See application file for complete search history.

(56) References Cited

U.S. PATENT DOCUMENTS

| | | | |
|---|---|---|---|
| 2013/0045061 A1 | 2/2013 | Ishi | |
| 2013/0115022 A1 | 5/2013 | Ishi | |
| 2018/0221969 A1* | 8/2018 | Oprasic | B23C 5/202 |
| 2018/0339350 A1* | 11/2018 | Mura | B23C 5/202 |
| 2019/0030629 A1* | 1/2019 | Vlcek | B23C 5/202 |

FOREIGN PATENT DOCUMENTS

| | | | | |
|---|---|---|---|---|
| JP | 2016163911 A | 9/2016 | | |
| WO | WO-2012046556 A1 * | 4/2012 | | B23C 5/109 |
| WO | 2017129423 A1 | 8/2017 | | |

\* cited by examiner

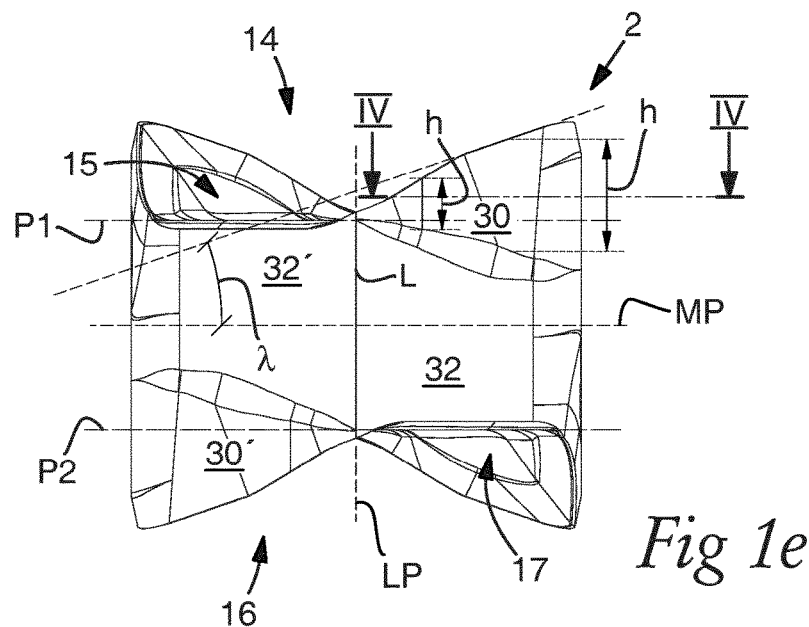
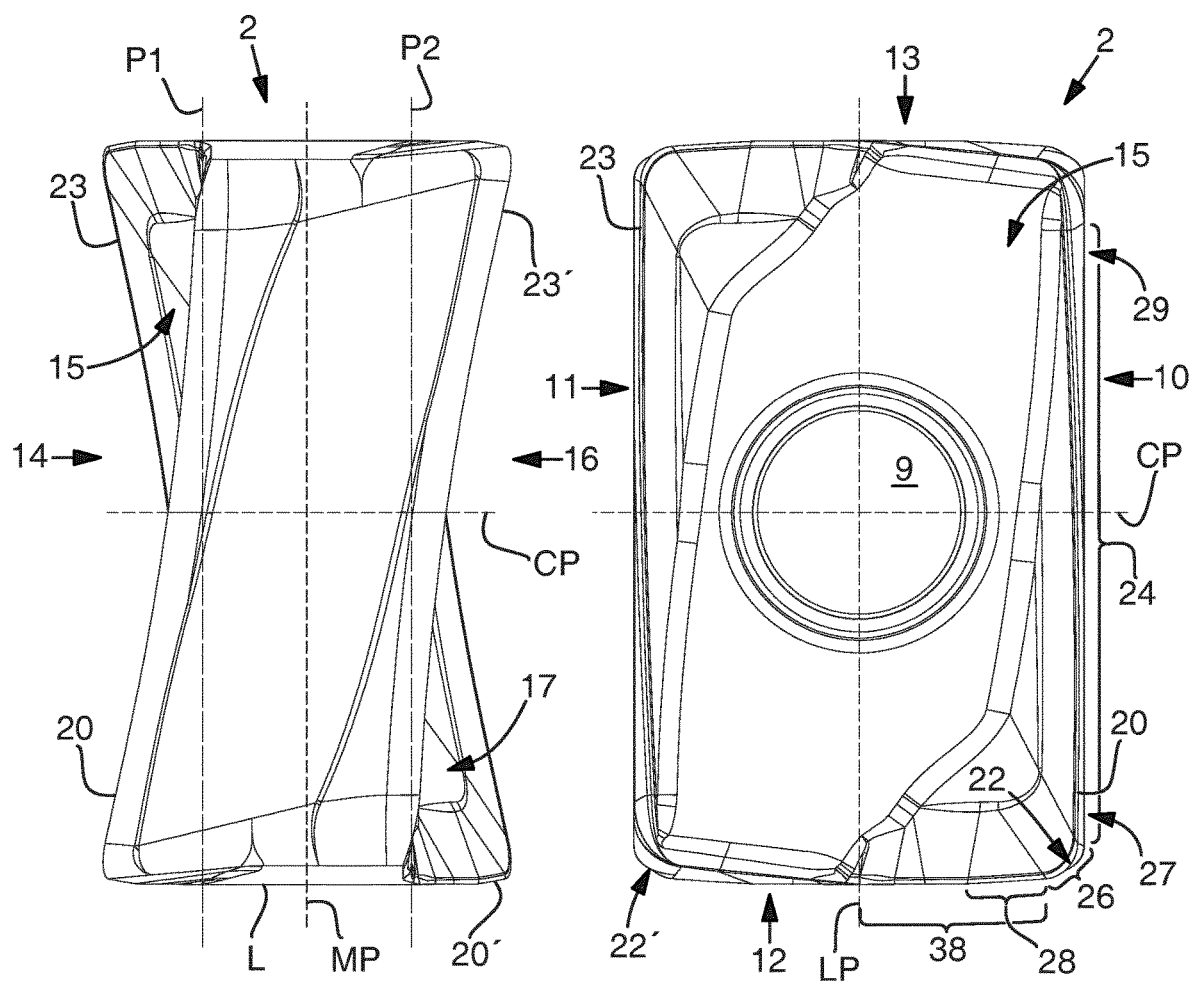
Fig 1e
Fig 1f Fig 1g

CUTTING INSERT AND MILLING TOOL

RELATED APPLICATION DATA

This application is a § 371 National Stage Application of PCT International Application No. PCT/EP2019/059008 filed Apr. 10, 2019 claiming priority to EP 18167558.8 filed Apr. 16, 2018.

TECHNICAL FIELD

The present disclosure relates to a cutting insert for a milling tool. The present disclosure also relates to a milling tool.

BACKGROUND

A milling tool is a rotating cutting tool, which may be provided with one or more replaceable cutting inserts. A square shoulder milling tool is configured for forming a square angle between two surfaces milled in a workpiece in a milling operation with the square shoulder milling tool.

A cutting insert may be manufactured from a material comprising e.g. one or more of cemented carbide, ceramics, cubic boron nitride, polycrystalline diamond, and/or cermet. The raw material in the form of powder is pressed in a die to form a green body. Multiaxial pressing (MAP) may be utilised for forming the green body. Compared to conventional pressing, MAP makes it possible to produce green bodies with more complex shapes. The green body as such is porous. When sintered, the green body is compacted, shrinks in size and forms the cutting insert. Surfaces and cutting edges of the cutting insert may be ground after sintering. Depending on the milling operations to be performed with the cutting insert in a milling tool, abutment faces of the cutting insert which are arranged to abut against support surfaces of the milling tool, may be ground to specific tolerances.

EP 3072616 discloses a cutting insert comprising an insert body having a central longitudinal axis. The insert body comprises a first radial side and a second radial side. A first axial side comprises a first relief face, a second relief face, and a first recess having a first bottom surface. The first and second relief faces and the first bottom surface are arranged such that each point of them is visible from either a first side view towards the first radial side or from a second side view towards the second radial side, and such that the insert body is longer along the longitudinal direction at a central portion towards the central longitudinal axis than at an outer portion towards one of the first or second radial side seen in a section of a median plane through the insert. Thus, the cutting insert is formable by multiaxial pressing (MAP) with a partition of a relevant pressing tool at the central longitudinal axis. The first and second relief faces, and the first recess are formed in the MAP operation. However, due to the first recess being formed during the MAP operation, the insert may distort during a subsequent sintering process. Resulting errors in the shape of the insert body have to be taken account of in the process of designing the pressing tool for MAP Alternatively, errors in shape have to be corrected in grinding operations, following the sintering.

SUMMARY

It would be advantageous to achieve a cutting insert overcoming, or at least alleviating, at least some of the above mentioned drawbacks. In particular, it would be desirable to enable a cutting insert which can be manufacture utilizing MAP and with good form stability during sintering. To better address one or more of these concerns, a cutting insert is provided. The cutting insert is an insert suitable for a milling tool and comprises:

a first side defining a first extension plane, a second side opposite to the first side defining a second extension plane, wherein a centre axis extends perpendicularly through the first and second extension planes, a circumferential surface extending between the first side and the second side, the circumferential surface comprising a first pair of opposing side surfaces and a second pair of opposing side surfaces, a median plane extending halfway between the first extension plane and the second extension plane, a longitudinal plane extending halfway between the first pair of opposing side surfaces, perpendicularly to the median plane and containing the centre axis, a central plane extending perpendicularly to both the median plane and the longitudinal plane and containing the centre axis, a first axis extending along an intersection between the median plane and the longitudinal plane and a second axis extending along an intersection between the median plane and the central plane. A first cutting edge extends along an intersection between the first side and the circumferential surface on a first side of the longitudinal plane, the first cutting edge, as seen in a view towards the first side, extending along a first corner of the cutting insert. A second cutting edge extends along an intersection between the second side and the circumferential surface on a second side of the longitudinal plane, the second cutting edge, as seen in a view towards the second side, extending along a second corner of the cutting insert. The first cutting edge comprises a first main cutting edge, a first corner cutting edge, and a first auxiliary cutting edge, the first auxiliary cutting edge comprising a first surface-wiping secondary cutting edge, wherein the first main cutting edge adjoins the first corner cutting edge, and the first corner cutting edge adjoins the first surface-wiping secondary cutting edge. The second cutting edge comprises a second main cutting edge, a second corner cutting edge, and a second auxiliary cutting edge, the second auxiliary cutting edge comprising a second surface-wiping secondary cutting edge, wherein the second main cutting edge adjoins the second corner cutting edge, and the second corner cutting edge adjoins the second surface-wiping secondary cutting edge. Seen in a direction along the first axis A1, a first axial relief face adjacent to the first auxiliary cutting edge and a first axial abutment face form part of a first surface grouping on the first side of the longitudinal plane, and a second axial relief face adjacent to the second auxiliary cutting edge and a second axial abutment face form part of a second surface grouping on the second side of the longitudinal plane. The first axial relief face comprises a first part of the first axial relief face adjacent to the first surface-wiping secondary cutting edge, and the second axial relief face comprises a first part of the second axial relief face adjacent to the second surface-wiping secondary cutting edge, at least the first part of the first axial relief face forming an obtuse first inner angle with the median plane when seen in a section parallel to the longitudinal plane and at least the first part of second axial relief face forming an obtuse second inner angle with the median plane when seen in a section parallel to the longitudinal plane. The first surface grouping and the second surface grouping form part of the circumferential surface. The insert has 180° rotational symmetry with respect to rotation about the second axis and/or the first axis and/or the centre axis. Measured in a direction in parallel with the longitudinal plane, in a section of the median plane through the cutting insert, the cutting insert is longest along the longitudinal plane. Seen in a direction along the second axis, each point of the first surface grouping has a unique projection point on the longitudinal plane. Seen in a direction along the second axis in an opposite direction, each point of the second surface grouping has a unique projection point on the longitudinal plane LP. The first surface grouping and the second surface grouping meet in a partitioning line, wherein the partitioning line extends in the longitudinal plane, and wherein the partitioning line extends from the first side to the second side.

Since the cutting insert is longest along the longitudinal plane in the section of the median plane through the cutting insert, measured in a direction in parallel with the longitudinal plane, since seen in the direction along the second axis, each point of the first surface grouping has a unique projection point on the longitudinal plane, since the first surface grouping and the second surface grouping meet in the partitioning line, since the partitioning line extends in the longitudinal plane, and since the partitioning line extends from the first side to the second side, the first and second axial relief faces are formable in a MAP operation. Moreover, also the first and second surface groupings are formable in a MAP operation. More specifically, a MAP pressing tool for forming a green body comprises two side parts configured for forming the circumferential surface. The two side parts can be retracted after the MAP operation in a linear path of motion from the finish-pressed green body in such a way that each point on the surfaces of the two parts immediately clears from the green body. Thus, the cutting insert is configured for manufacturing utilising MAP.

Thanks to the fact that the partitioning line extends in the longitudinal plane from the first side to the second side, the circumferential surface of the insert can be formed by two side parts of the MAP pressing tool, which two side parts meet each other along one plane the longitudinal plane. This, in its turn, simplifies manufacturing of the pressing tool, makes it possible to easier achieve the tolerances which are necessary for good tolerances of the insert and decrease the thickness and the size of burrs on the insert, which burrs appear on the green body (and due to that on the insert too after subsequent sintering) in the area of the borderline between the two side parts of the pressing tool. Moreover, the cutting insert may be manufacture utilising MAP with improved form stability during sintering.

The cutting insert may herein alternatively be referred to simply as the insert. The cutting insert is configured to be a square shoulder milling cutting insert and to be fixed in an insert seat of a square shoulder milling tool. Hence, the square shoulder milling tool is configured for cutting a 90° shoulder in a workpiece.

The cutting insert may preferably be manufactured from a cemented carbide material or cermet, but it may alternatively comprise e.g. one or more of ceramics, cubic boron nitride, and/or polycrystalline diamond. The cutting insert may be coated with surface coatings such as e.g. titanium nitride, titanium carbonitride, and/or aluminium oxide.

When arranged in an insert seat of a square shoulder milling tool, the first and second sides of the cutting insert face approximately in opposing tangential directions of a rotational direction of the square shoulder milling tool. The first pair of opposing side surfaces face in opposing radial directions of the square shoulder milling tool. The second pair of opposing side surfaces face in opposing axial directions of the square shoulder milling tool. The first and second sides of the cutting insert are preferably provided with flat or generally flat tangential support surfaces which are parallel or substantially parallel to the median plane. The insert may be provided with a screw hole for a simple mounting of the insert in an insert seat of the milling tool.

The first inner angle and the second inner angle may be within a range of 91-115 degrees, preferably within a range of 94-110 degrees. Thus, in relation to a normal of the median plane MP, a positive relief angle in a range of 1-25 degrees, preferably within a range of 4-20 degrees may be provided. The first inner angle and the second inner angle are preferably but not necessarily equal to each other along the first respective second surface-wiping secondary cutting edges.

The circumferential surface is comprising corner surfaces extending between the first side and the second side and connecting each surface of the first pair of opposing side surface to each surface of the second pair of opposing side surfaces. Both the first axial relief face and the first axial abutment face are adjacent to a first corner surface and preferably tangentially connected to the first corner surface. Both the second axial relief face and the second axial abutment face are adjacent to a second corner surface and preferably tangentially connected to the second corner surface. Thanks to this, the second pair of opposing side surfaces are simplified which contributes to a simplification of the pressing tool parts that are creating or forming the second pair of opposing side surfaces which in its turn improves the tolerances of the final insert.

When arranged in an insert seat of a square shoulder milling tool, the main cutting edge (e.g. the first main cutting edge) is configured for cutting a 90° shoulder or wall in the workpiece, in relation to the surface-wiping secondary cutting edge (e.g. the first surface-wiping secondary cutting edge) extending in a plane perpendicular or substantially perpendicular to the axial direction of the square shoulder milling tool and configured for surface-wiping the workpiece surface extending perpendicularly to the axial direction of the square shoulder milling tool. The main cutting edge (e.g. the first main cutting edge) extends axially away from a first axial end of the tool toward a second axial end of the tool, which second axial end is opposite to the first end of the tool. The main cutting edge has preferably but not necessarily a positive axial slope. The surface-wiping secondary cutting edge (e.g. the first surface-wiping secondary cutting edge) has a radial extension and extends in a direction from the radial periphery of the tool and radially inwardly. The surface-wiping secondary cutting edge can be oriented in a radial direction toward the rotation axis of the tool. The cutting insert is a double-sided cutting insert. The cutting insert may advantageously provide a total of four indexable cutting edges to be used for square shoulder milling.

According to one embodiment of the invention, the partitioning line may be a straight line. In this manner, the first and second surface groupings may be even more easily formable in a MAP operation. More specifically, the pressing tool to be utilised in the MAP operation is easily manufactured. For instance, the partitioning line of the cutting insert may be formed where two parts of the pressing tool abut against each other. Moreover, the cutting insert may be manufacture utilising MAP with even more improved form stability during sintering. Namely, at the least along the partitioning line, the cutting insert thus, may not comprise any recesses, which may affect the form stability of the cutting insert when the green body is sintered after a MAP operation. This, in its turn, simplifies manufacturing of the pressing tool, makes it possible to easier achieve the tolerances which are necessary for good tolerances of the insert and decrease the thickness and the size of burrs on the insert, which burrs appear on the green body (and due to that on the insert too after subsequent sintering) in the area of the borderline between the two side parts of the pressing tool.

According to a further one embodiment of the invention, the partitioning line may extend perpendicularly to the median plane. In this manner, the pressing tool to be utilised in the MAP operation is easily manufactured, the tolerances can be furthermore and easier improved and the burrs are furthermore decreased. For instance, the partitioning line of the cutting insert may be formed where two parts of the pressing tool abut against each other.

According to a further one embodiment of the invention, seen in a section of the median plane, an obtuse third inner angle is formed between the first surface grouping and the second surface grouping. The third inner angle might be in the interval from 150-178 degrees, preferably in the interval from 164-172 degrees, preferably approximately 168 degrees.

According to a further one embodiment, the first axial abutment face may form a substantially flat surface. In this manner, the first axial abutment face may form a surface suitable for abutting against an axial support surface in an insert seat of a square shoulder milling tool. Since the cutting insert has 180° rotational symmetry with respect to rotation about the second axis and/or the first axis and/or the centre axis, the first axial abutment face may abut against the axial support surface when a different cutting edge of the cutting insert than the first cutting edge is positioned in the insert seat for cutting engagement with a workpiece. As the first axial abutment face is a substantially flat surface, the abutment against the axial support surface is easier to control, which contributes to a decrease of the axial tolerances of the tool.

According to a further one embodiment, the first axial abutment face may extend perpendicularly to the median plane. In this manner, a more exact positioning of the cutting insert in an insert seat of a square shoulder milling tool may be achieved. More specifically, a deviation from a target thickness of the cutting insert, i.e. in a direction along the centre axis of the insert, may not affect axial runout of the cutting insert, or at least may affect axial runout only to a limited extent, when the cutting insert is mounted in the insert seat of the square shoulder milling tool. That is, thickness variations of the cutting insert do not, or substantially not, affect the axial position of the cutting insert in the insert seat when the axial rake angle for the median plane is 0 degrees, or when the absolute value of the rake angle for the median plane is close to 0 degrees, or in other words when the median plane is parallel or substantially parallel to a rotation axis of the milling tool. In this context, it should be pointed out that a deviation from 0 degrees can be within some degrees but in spite of that the thickness variation of the cutting insert will not substantially affect the axial position of the cutting insert in the insert seat. Namely, the first axial abutment face extending perpendicularly to the median plane, as the first axial abutment face abuts against the axial support surface in the insert seat as discussed above, entails that thickness variations of the cutting insert do not, or substantially not, affect the axial position of the cutting insert in the insert seat.

According to a further one embodiment, the first axial abutment face may form a substantially flat surface extending from the median plane towards the second side. In this manner, the cutting insert may be manufacture utilising MAP with improved form stability during sintering. Namely, the first surface grouping thus, may not comprise any recesses that must be formed by two side parts of the MAP pressing tool, which may affect the form stability of the cutting insert when the green body is sintered after a MAP operation.

According to a further one embodiment, the first axial abutment face may form a substantially flat surface extending from the median plane to the second side. In this manner, the cutting insert may be manufacture utilising MAP with improved form stability during sintering. Namely, the first surface grouping thus, may not comprise any recesses that must be formed by two side parts of the MAP pressing tool, which may affect the form stability of the cutting insert when the green body is sintered after a MAP operation.

According to a further one embodiment, seen in the direction along the first axis and projected on the central plane, the first axial abutment face may form at least 30% of the first surface grouping. In this manner, the first axial abutment face may form a large part of the first surface grouping. As such, good form stability may be provided during sintering of the cutting insert. Moreover, the first axial abutment face may provide stable axial support when abutting against an axial support surface in an insert seat of a milling tool.

According to a further one embodiment, the first auxiliary cutting edge may comprise at least a second cutting edge part of the first auxiliary cutting edge, said second cutting edge part being closer to the longitudinal plane than the first surface-wiping secondary cutting edge. The first axial relief face may comprise at least a second part of the first axial relief face, said second part being adjacent to the second cutting edge part of the first auxiliary cutting edge, wherein said second part of the first axial relief face may create an obtuse fourth inner angle with the first part of the first axial relief face. In this manner, the first and second parts of the first axial relief face do not extend in one and the same plane. Thus, when the insert is mounted in the insert seat, the second cutting edge part of the first auxiliary cutting edge can be positioned furthest out in the longitudinal direction and separated from the work-piece surface created by the first surface-wiping secondary cutting edge, without a big and abrupt change of the direction of the first auxiliary cutting edge (seen in a view along the first axis) in the transition between the first surface-wiping secondary cutting edge and the second cutting edge part of the first auxiliary cutting edge. Thanks to this, during manufacturing of cutting insert, the part of the pressing tool which creates the first side (and/or the part of the pressing tool which creates the second side) is not subject to high stress concentrations in the area of the transition between the first surface-wiping secondary cutting edge and the second cutting edge part of the first auxiliary cutting edge.

According to a further one embodiment, when seen in different sections in parallel with the longitudinal plane and through the first auxiliary cutting edge, in each of said different sections in parallel with the longitudinal plane the first axial relief face may form a fifth inner angle in relation to the median plane measured adjacent to the auxiliary cutting edge. The fifth inner angle differs for at least some of said different sections in parallel with the longitudinal plane. In this manner, the first axial relief face may be arranged such that an uncomplex transition to at least some adjacent surfaces, such as the first axial abutment face, may be achieved. In turn, this may provide simple connections between the first axial relief face and at least some adjacent surfaces. Thus, corresponding parts of a pressing tool utilised in a MAP operation may be uncomplex in a corresponding manner. A less complex pressing tool provides for manufacturing cutting inserts in a cost efficient manner. This also provides for higher precision, i.e. a decrease in tolerances, in the forming of the green body and the manufacturing of the cutting insert.

According to a further one embodiment, the fifth inner angle, at an end of the first axial relief face close to the longitudinal plane, may be equal to or substantially equal to an inner angle of the partitioning line to the median plane. In this manner, a simple transition from the first axial relief face to the partitioning line, and/or to the axial abutment faces as the case may be, may be achieved. Thus, corresponding parts of a pressing tool utilised in a MAP operation may be uncomplex in a corresponding manner. A less complex pressing tool provides characteristics suitable for manufacturing in a cost-efficient manner. This also provides for higher precision, i.e. a decrease in tolerances, in the forming of the green body and the manufacturing of the cutting insert.

According to a further one embodiment, seen in any section through the partitioning line and in parallel with the median plane, the partitioning line may extend immediately adjacent to the first axial abutment face and/or to the second axial abutment face. In this manner, a limited number of surfaces may be arranged adjacent to the partitioning line. Thus, corresponding parts of a pressing tool utilised in a MAP operation may be uncomplex in a corresponding manner. A less complex pressing tool provides characteristics suitable for manufacturing in a cost-efficient manner. This also provides for higher precision, i.e. a decrease in tolerances, in the forming of the green body and the manufacturing of the cutting insert.

According to a further one embodiment, seen in a view along the centre axis on the first side of the longitudinal plane, for part of the cutting insert which is between the median plane and the second side, the first axial abutment face forms a surface of the first surface grouping which is the most distant surface of the cutting insert from the centre axis. In this manner, no recesses are provided in the first surface grouping between the median plane and the second side. Accordingly, the cutting insert may be manufacture utilising MAP with improved form stability during sintering. The lack of recesses has a positive effect on the form stability of the cutting insert when the green body is sintered after a MAP operation.

According to a further aspect of the invention, there is provided a milling tool configured to be rotated about a rotation axis comprising a tool body, wherein the tool body at a first axial end portion thereof is provided with an insert seat for receiving a cutting insert. The milling tool comprises a cutting insert according to any one of aspects and/or embodiments discussed herein arranged in the insert seat. In this manner, a milling tool is provided, which is arranged for use with a cutting insert configured for being manufactured utilising MAP.

The milling tool may be a square shoulder milling tool.

The insert seat may be provided with a threaded hole and the insert may be provided with a screw hole. A fastening member, preferably a screw, may be used for fastening the insert in the seat, wherein the screw co-operates with the threaded hole in the insert seat.

According to a further embodiment, the insert seat may be provided with a tangential support surface, a radial support surface, and an axial support surface. In this manner, a secure positioning of the cutting insert in the insert seat may be provided.

Preferably, the radial support surface and/or the axial support surface are intersected by the median plane of the cutting insert when the insert is mounted in the insert seat. In this manner, a secure positioning of the cutting insert in the insert seat may be provided. Preferably, at least a part of the axial support surface and/or at least a part of the radial support surface is situated on the same side of the media plane as the cutting edge which is in the operable position, when the insert is mounted in the insert seat. In this manner, a secure and stable positioning of the cutting insert in the insert seat may be provided. Preferably, at least a part of the axial support surface and/or at least a part of the radial support surface is situated on the same side of the median plane as the cutting edge which is in the operable position, when the insert is mounted in the insert seat at the same time as at least a second part of the axial support surface and/or at least a second part of the radial support surface is situate on the opposite side of the median plane. In this manner, a secure and stable positioning of the cutting insert in the insert seat may be provided.

According to a further one embodiment, the axial support surface may extend perpendicularly or substantially perpendicularly to the tangential support surface. In this manner, a secure positioning of the cutting insert in the insert seat may be provided. Preferably, the radial support surface may extend perpendicularly or substantially perpendicularly to the tangential support surface. In this manner, a secure a positioning of the cutting insert in the insert seat may be provided.

According to a further one embodiment, the axial support surface may extend in a first support plane, wherein the first support plane may cross the rotation axis on a side of the insert seat opposite to the first axial end portion. In this manner, an axial force applied to the cutting insert during a milling operation may provide a radial force component at the axial support surface pushing against the cutting insert radially inwardly. Thus, the cutting insert may be securely positioned in the insert seat.

According to a further one embodiment, the radial support surface may extend in a second support plane, wherein the second support plane may cross the rotation axis on a same side of the insert seat as the first axial end portion. In this manner, the first main cutting edge of the cutting insert may be arranged to extend substantially in parallel with the rotation axis of the milling tool. Thus, a milling operation in a workpiece may result in a workpiece surface extending substantially in parallel with the rotation axis of the milling tool. This may be particularly advantageous in embodiments of the cutting insert wherein seen in a view along the centre axis, at least part of a first radial relief face adjacent to the first main cutting edge is arranged outside of the first main cutting edge relative to the centre axis with less of the first radial relief face being arranged outside of the first main cutting edge towards the first corner cutting edge than farther away from the first corner cutting edge. The first radial relief face may extend a minimum outside the first main cutting edge at a distance from the first corner cutting edge.

According to a further one embodiment, the cutting insert may be arranged with a portion of the second side abutting against the tangential support surface, a portion of the circumferential surface abutting against the radial support surface, and the first axial abutment face abutting against the axial support surface. In this manner, the cutting insert may be securely positioned in the insert seat.

According to a further one embodiment, the insert seat may be configured to provide an axial rake angle for the median plane of the cutting insert arranged in the insert seat, and wherein the insert seat may be configured to provide an axial rake angle γp equal to 0 degrees or a negative axial rake angle γp having an absolute value within a range of $0<|γp|≤3$ degrees, or within a range of $0.5≤|γp|≤2$ degrees, or of approximately 1 degree. In this manner, a low tilting of the cutting insert in an axial direction of the milling tool may be provided. Thus, provisions for an exact positioning of the cutting insert in the insert seat may be achieved. A deviation from a target thickness of the cutting insert, i.e. in a direction along the centre axis of the cutting insert, may not affect axial runout of the cutting insert, or at least may affect axial throw/runout only to a limited extent. When the axial support surface in the insert seat extents perpendicularly or substantially perpendicularly to the rotation axis of the milling tool, seen in a tangential direction of the axial support surface, the first axial abutment face of the cutting insert extending perpendicularly to the median plane, entails that thickness variations of the cutting insert do not affect the axial position of the cutting insert in the insert seat.

According to a further one embodiment, the insert seat may be configured to provide a negative radial rake angle for the median plane of the cutting insert arranged in the insert seat, and wherein the insert seat is configured to provide a negative radial rake angle γf having an absolute value within a range of $10≤|γf|≤30$ degrees, or within a range of $15≤|γf|≤25$ degrees. In this manner, a functional positive relief angle of the main cutting edge may be formed by the radial rake angle. This may be particularly advantageous in embodiments of the cutting insert wherein seen in a view along the centre axis, at least part of a first radial relief face adjacent to the first main cutting edge is arranged outside of the first main cutting edge relative to the centre axis with less of the first radial relief face being arranged outside of the first main cutting edge towards the first corner cutting edge than farther away from the first corner cutting edge.

Further features and advantages will become apparent when studying the appended claims and the following detailed description.

BRIEF DESCRIPTION OF THE DRAWINGS

Various aspects and/or embodiments including particular features and advantages, will be readily understood from the example embodiments discussed in the following detailed description and the accompanying drawings, in which:

FIGS. 1a-1g illustrate different views of a cutting insert according to embodiments.

DETAILED DESCRIPTION

Figure 1A:
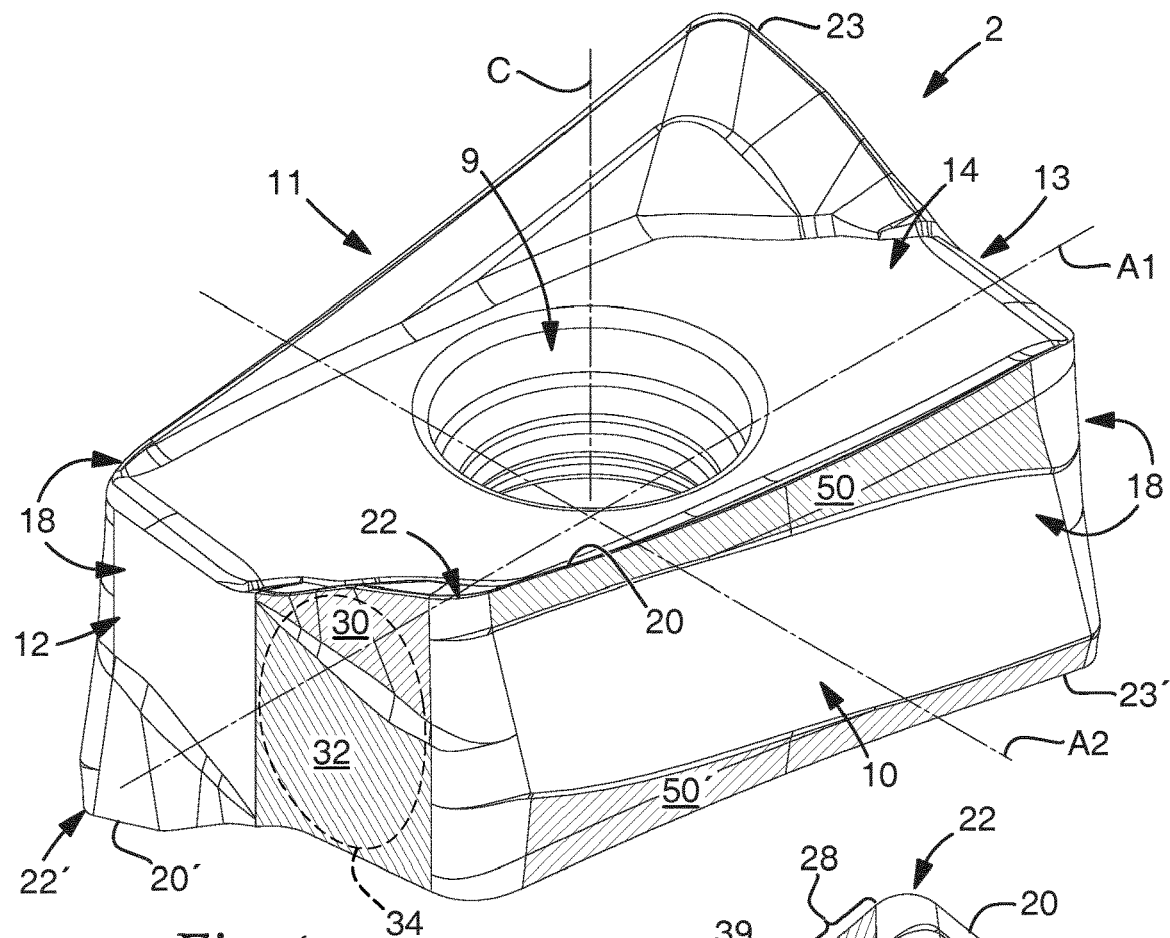

Aspects and/or embodiments will now be described more fully. Like numbers refer to like elements throughout. Well-known functions or constructions will not necessarily be described in detail for brevity and/or clarity. In the following, reference is made to various inner angles. Herein, an inner angle means that the angle is seen and/or measured within a body, or at least mainly within a body, of a cutting insert.

FIGS. 1a-1g illustrate different views of a cutting insert 2 according to embodiments. The cutting insert 2 is configured for use in a milling tool, more specifically in a square shoulder milling tool. The cutting insert 2 comprises a first side 14, a second side 16 opposite to the first side 14, and a circumferential surface 18 extending between the first side 14 and the second side 16. The circumferential surface 18 comprises a first pair of opposing side surfaces 10, 11, and a second pair of opposing side surfaces 12, 13, see FIGS. 1a, 1c and 1g.

The first side 14 defines a first extension plane P1. The second side 16 defines a second extension plane P2. A centre axis C extends perpendicularly through the first and second extension planes P1, P2. In these embodiments, the cutting insert 2 comprises a through hole 9 for securing the cutting insert 2, e.g. by means of a screw, in an insert seat of a milling tool. The through hole 9 extends centrally through the cutting insert 2. The centre axis C extends along a centre of the through hole 9. According to alternative embodiments, wherein the cutting insert does not comprise a through hole, the cutting insert may instead be secured in an insert seat of a milling tool by clamping means.

Figure 1B:
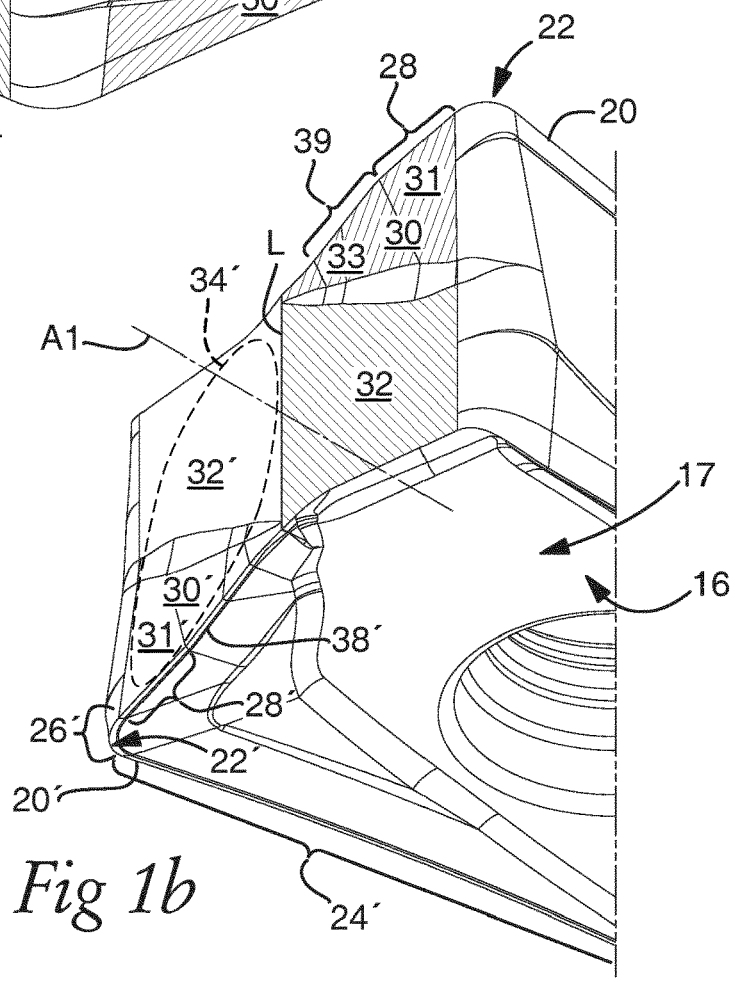
Figure 1C:
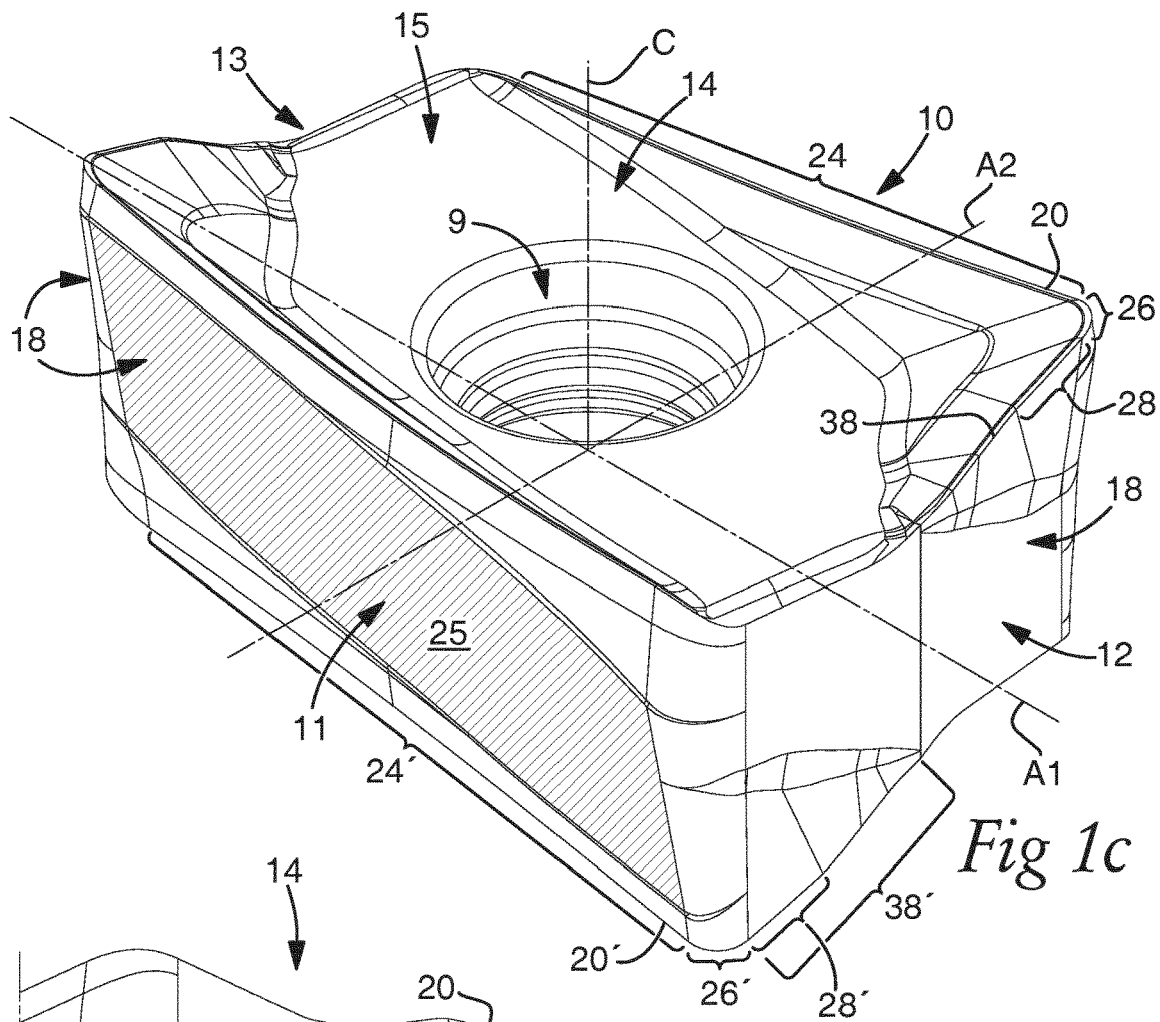
Figure 1D:
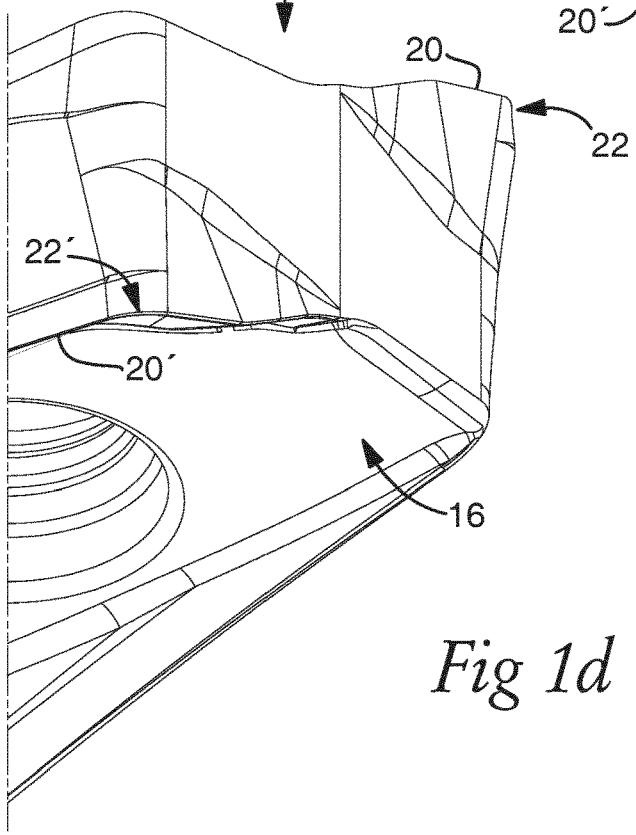

A median plane MP extends halfway between the first extension plane P1 and the second extension plane P2. The median plane MP extends in parallel with the first and second extension planes P1, P2. A longitudinal plane LP extends halfway between the first pair of opposing side surfaces 10, 11, perpendicularly to the median plane MP and containing the centre axis C. A central plane CP extends perpendicularly to both the median plane MP and the longitudinal plane LP and contains the centre axis C. A first axis A1 extends along an intersection between the median plane MP and the longitudinal plane LP. A second axis A2 extends along an intersection between the median plane MP and the central plane CP. The centre axis C and the first and second axes A1, A2 are shown in FIGS. 1a and 1c.

The first and second extension planes P1, P2, the median plane MP, the longitudinal plane LP, and the central plane CP are imaginary planes, and are shown in FIGS. 1e-1g. The median plane MP extents through the entire circumferential surface 18. The longitudinal plane LP extents through the second pair of opposing side surfaces 12, 13. The central plane CP extents through the first pair of opposing side surfaces 10, 11.

At the first side 14, the cutting insert 2 comprises a first surface 15 extending between the circumferential surface 18. The first surface 15 may be substantially flat along parts thereof. In other parts, such as closer to cutting edges, the first surface 15 may be raised, e.g. in order to provide one or more rake faces. At the second side 16 the cutting insert 2 comprises a second surface 17 extending between the circumferential surface 18. The second surface 17 may be substantially flat along parts thereof. In other parts, such as closer to cutting edges, the second surface 17 may be raised, e.g. in order to provide one or more rake faces.

The first surface 15 and the second surface 17, are flat surfaces extending in parallel with the median plane, but they may alternatively be inclined or non-planar. The first surface 15 and the second surface 17 may e.g. be profiled, or comprise a plurality of partial surfaces, wherein some or each partial surface/s is/are not parallel to the median plane.

The first surface 15 and the second surface 17 might have a function of an anti-rotation locking interface, and/or an interface that locks the cutting insert axially and/or radially. Preferably, they are mainly flat surface, or a slightly convex or concave surface, or a surface having a slight inclination toward a centre of the cutting insert. The first surface 15 and the second surface 17 are arranged such that they can serve as a main support surface of the cutting insert when the cutting insert is mounted in an insert seat of a milling tool.

A first cutting edge 20 extends along an intersection between the first side 14 and the circumferential surface 18 on a first side of the longitudinal plane LP, see e.g. FIGS. 1a, 1c, and 1g. The first cutting edge 20, as seen in a view towards the first side 14, i.e. in a view along the centre axis C (FIG. 1g), extends along a first corner 22 of the cutting insert 2. A second cutting edge 20' extends along an intersection between the second side 16 and the circumferential surface 18 on a second side of the longitudinal plane LP. The second cutting edge 20', as seen in a view towards the second side 16, i.e. in a view along the centre axis C, extends along a second corner 22' of the cutting insert 2, see e.g. FIGS. 1c and 1d. The first cutting edge 20 extends along an intersection between the first side 14 and a first side surface 10 of the first pair of opposing side surfaces 10, 11 and a first side surface 12 of the second pair of opposing side surfaces 12, 13. The second cutting edge 20' extends along an intersection between the second side 16 and a second side surface 11 of the first pair of opposing side surfaces 10, 11 and the first side surface 12 of the second pair of opposing side surfaces 12, 13.

The first cutting edge 20 comprises a first main cutting edge 24, a first corner cutting edge 26, and a first auxiliary cutting edge 38. The first auxiliary cutting edge 38 comprises a first surface-wiping secondary cutting edge 28. The first main cutting edge 24 adjoins the first corner cutting edge 26, and the first corner cutting edge 26 adjoins the first surface-wiping secondary cutting edge 28. The second cutting edge 20' comprises a second main cutting edge 24', a second corner cutting edge 26', and a second auxiliary cutting edge 38'. The second auxiliary cutting edge 38' comprises a second surface-wiping secondary cutting edge 28'. The second main cutting edge 24' adjoins the second corner cutting edge 26', and the second corner cutting edge 26' adjoins the second surface-wiping secondary cutting edge 28'. The insert has at least two cutting edges. The first auxiliary cutting edge 38 and the second auxiliary cutting edge 38' need not to have cutting ability along their respective last part close to the longitudinal plane LP. It is enough for the performance that the first surface-wiping secondary cutting edge 28 and a second cutting edge part 39 have cutting ability. The same is valid for corresponding parts of the second auxiliary cutting edge 38'.

When seen along the second axis A2, in the view of FIG. 1f, the first main cutting edge 24 has a concave shape. The same applies to the other main cutting edges. However, the shape of the main cutting edges may also be convex or straight when seen along the second axis A2.

In these embodiments, the cutting insert 2 further comprises a third and a fourth cutting edge 23, 23' arranged opposite to the first and second cutting edges 20, 20'. The third cutting edge 23 extends along an intersection between the first side 14 and the second side surface 11 of the first pair of opposing side surfaces 10, 11 and a second side surface 13 of the second pair of opposing side surfaces 12, 13. The fourth cutting edge 23' extends along an intersection between the second side 16 and the first side surface 10 of the first pair of opposing side surfaces 10, 11 and the second side surface 13 of the second pair of opposing side surfaces 12, 13.

In these embodiments, the insert 2 has 180° rotational symmetry with respect to rotation about each of the second axis A2, the first axis A1, and the centre axis C. According to alternative embodiments, the insert may have 180° rotational symmetry with respect to rotation about the second axis A2, and/or the first axis A1, and/or the centre axis C.

In these embodiments, the cutting insert 2 is double-sided and four times indexable, i.e. the cutting insert 2 comprises four identical cutting edges 20, 20', 23, 23' in total, such that the cutting insert 2 can be mounted in four different index positions in the square shoulder milling tool, to provide one active cutting edge at a time for milling a workpiece. However, it is not necessary that all four cutting edges are identical. They can, for example, be identical in pairs a first pair of the main cutting edges can have a first slope angle in relation to the median plane and a second pair of the main cutting edges can have a second slope angle in relation to the median plane, wherein the second slope angle is different from the first slope angle.

For each of the cutting edges 20, 20', 23, 23' the following applies. When arranged in the shoulder milling tool, the main cutting edge 24 is extending in an axial direction of the shoulder milling tool and is fed into a workpiece, in a radial direction of the shoulder milling tool. The auxiliary cutting edge 38 and the surface-wiping secondary cutting edge 28 is extending in a radial direction of the shoulder milling tool. In a shoulder milling operation, the main cutting edge 24 performs a major cut into the workpiece, while the surface-wiping secondary cutting edge 28 only performs a shallow surface smoothing cut. The auxiliary cutting edge 38 and the surface-wiping secondary cutting edge 28 is inclined in relation to the median plane MP such that a distance to the median plane MP increases in a direction away from the longitudinal plane LP and toward the corner cutting edge 26. Accordingly, close to the corner cutting edge 26 the auxiliary cutting edge 38 extends farther from the median plane MP than towards the longitudinal plane LP.

The first pair of opposing side surfaces 10, 11 are configured to face radially inwardly and outwardly when arranged in an insert seat of a milling tool. The second pair of opposing side surfaces 12, 13 are configured to face in two opposite axial directions when arranged in the insert seat of the milling tool. Accordingly, each of the first pair of opposing side surfaces 10, 11 comprises two radial relief faces and a radial abutment face, and each of the second pair of opposing side surfaces 12, 13 comprises two axial relief face and two axial abutment faces.

The insert is longer along the longitudinal plane LP than along the central plane CP. A relationship W:L between a width W of the cutting insert 2 along the central plane CP and a length L of the cutting insert along the longitudinal plane LP may be within a range of 1:1.2 to 1:2. Mentioned purely as an example, e.g. W=10.76 mm and L=17.79 mm. The first and second corner cutting edges 26, 26' may have a cutting insert corner radius for forming a standard corner radius in a workpiece, such as a radius of e.g. 0.8 mm or 1.2 mm or 1.6 mm or any other standard corner radius value.

A first axial relief face 30 is arranged adjacent to the first auxiliary cutting edge 38. The first axial relief face 30 is indicated with hatching in a first direction in FIG. 1a. Seen in a direction along the first axis A1, the first axial relief face 30 and a first axial abutment face 32 form part of a first surface grouping 34 on the first side of the longitudinal plane LP. The first axial abutment face 32 is indicated with hatching in a second direction in FIG. 1a. The first axial abutment face 32 is configured to abut against an axial support surface in an insert seat of a milling tool when the fourth cutting edge 23' is positioned to form an active cutting edge in the milling tool. In FIG. 1a the first surface grouping 34 is only roughly indicated with a broken line. The first surface grouping 34 may comprise further surfaces, such as e.g. a transitional surface between the first axial relief face 30 and the first axial abutment face 32.

A second axial relief face 30' is arranged adjacent to the second auxiliary cutting edge 38'. Seen in a direction along the first axis A1, the second axial relief face 30' and a second axial abutment face 32' form part of a second surface grouping 34' on the second side of the longitudinal plane LP. The second axial relief face 30', the second axial abutment face 32', and the second surface grouping 34' are shown e.g. in FIG. 1b. The second axial abutment face 32' is configured to abut against an axial support surface in an insert seat of a milling tool when the third cutting edge 23 is positioned to form an active cutting edge in the milling tool. In FIG. 1b the second surface grouping 34' is only roughly indicated with a broken line. The second surface grouping 34' may comprise further surfaces, such as e.g. a transitional surface between the second axial relief face 30' and the second axial abutment face 32'.

The first surface grouping 34 and the second surface grouping 34' form part of the circumferential surface 18. More specifically, the first and second surface groupings 34, 34' form part of the first side surface 12 of the second pair of opposite side surfaces 12, 13.

The first surface grouping 34 and the second surface grouping 34' meet in a partitioning line L. The partitioning line L extends in the longitudinal plane LP. The partitioning line L extends from the first side 14 to the second side 16.

The first axial relief face 30 comprises a first part 31 of the first axial relief face 30 adjacent to the first surface-wiping secondary cutting edge 28, see FIG. 1b. The second axial relief face 30' comprises a first part 31' of the second axial relief face 30' adjacent to the second surface-wiping secondary cutting edge 28'.

A first side surface 10 of the first pair of opposing side surfaces 10, 11 comprises a first radial relief face 50 arranged adjacent to the first main cutting edge 24, see e.g. FIG. 1a. The first radial relief face 50 is indicated with hatching in a first direction in FIG. 1a. Seen in a view along the centre axis C, i.e. in the view of FIG. 1g, at least part of the first radial relief face 50 extends outside of the first main cutting edge 24 at least along a part of the first main cutting edge 24 such that the first radial relief face 50 extends more outside the first main cutting edge 24 towards a second end 29 of the main cutting edge 24 than towards the first end 27 of the main cutting edge 24. Seen in the view along the centre axis C, the first main cutting edge 24 may also be angled from the first end 27 towards the longitudinal plane LP.

In a similar manner, the first side surface 10 of the first pair of opposing side surfaces 10, 11 comprises a second radial relief face 50' arranged adjacent to main cutting edge of the fourth cutting edge 23'. The second radial relief face 50' is indicated with hatching in a second direction in FIG. 1a. Again, seen in a view along the centre axis C, this time from the opposite direction, at least part of the second radial relief face 50' extends outside of the main cutting edge of the fourth cutting edge 23' in the same manner as the first radial relief face 50 does in relation to the first main cutting edge 24.

Each of the first and second side surfaces 10, 11 of the first pair of opposing side surfaces 10, 11 comprises a radial abutment face 25 arranged between the first and second radial relief faces, see FIG. 1c. The radial abutment face 25 is indicated with hatching in FIG. 1c. The radial abutment face 25 is preferably perpendicular to the median plane MP, preferably perpendicular to the central plane and/or preferably parallel to the longitudinal plane LP.

Figure 2:
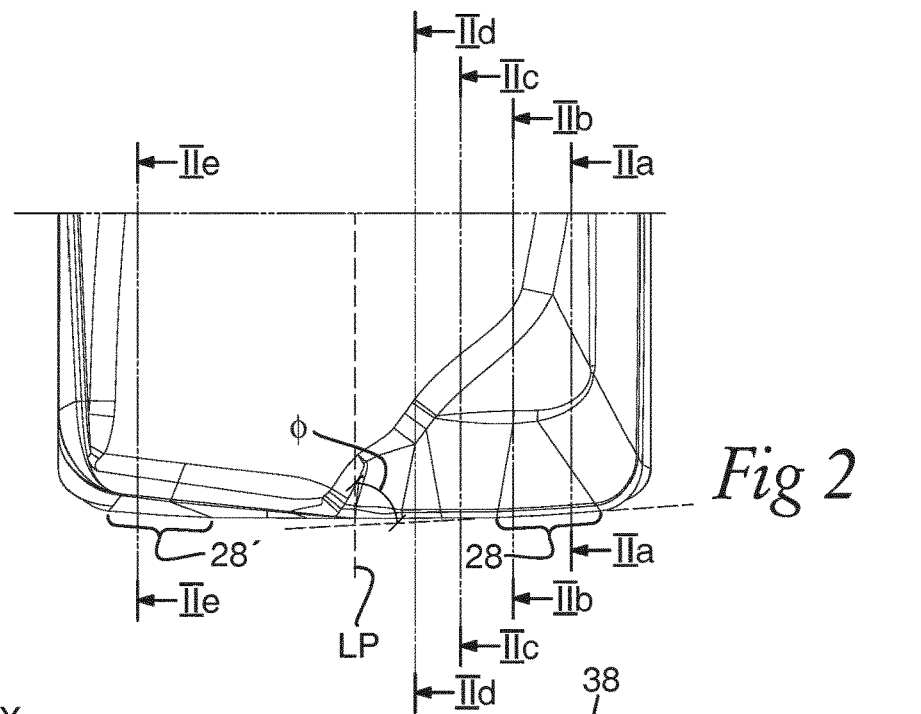
FIG. 2 shows a view of the cutting insert.
Figure 2A:
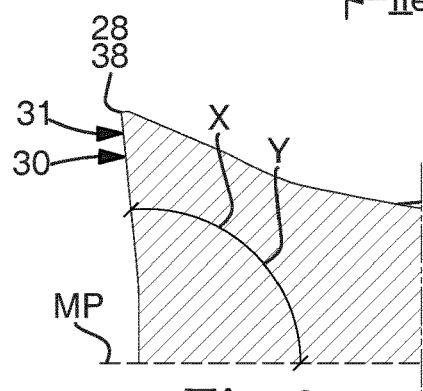
FIGS. 2a-e show cross sections extending along lines IIa-IIa, IIb-IIb, IIc-IIc, IId-IId, and IIe-IIe respectively, in FIG. 2.
Figure 2B:
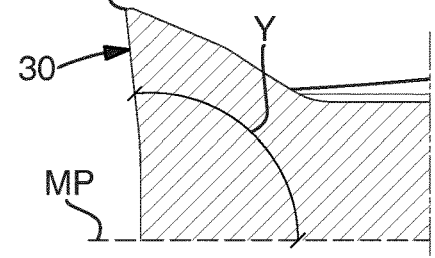
Figure 2C:
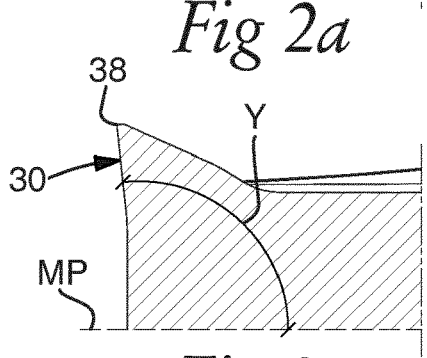

FIG. 2 shows a view of the cutting insert 2 according to the embodiments of FIGS. 1a-1g. FIG. 2a shows a cross section through the cutting insert 2 in parallel with the longitudinal plane LP along line IIa-IIa in FIG. 2.

Figure 2D:
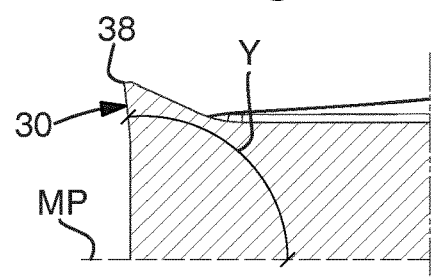
Figure 2E:
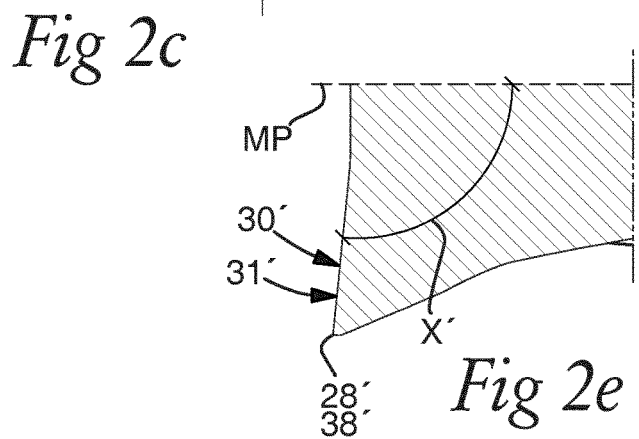

In the following, reference is made to FIGS. 1b, 2a, and 2e. The first part 31 of the first axial relief face 30 forms an obtuse first inner angle X with the median plane MP when seen in a section parallel to the longitudinal plane LP, see FIG. 2a. In a corresponding manner, the first part 31' of the second axial relief face 30' forms an obtuse second inner angle X' with the median plane MP when seen in a section parallel to the longitudinal plane LP, see FIG. 2e. In this manner, a positive axial relief angle is provided in the cutting insert 2 at the first and second surface-wiping secondary cutting edges 28, 28'. The first inner angle X and the second inner angle X' may be within a range of 91-115 degrees, preferably within a range of 94-110 degrees. Thus, in relation to a normal of the median plane MP, a positive relief angle in a range of 1-25 degrees, preferably within a range of 4-20 degrees may be provided. The first inner angle X and the second inner angle X' are preferably but not necessarily equal to each other along the first respective second surface-wiping secondary cutting edges 28, 28'. The value of the first inner angle X may vary along the first surface-wiping secondary cutting edges 28. The same applies to the second inner angle X'.

Figure 3:
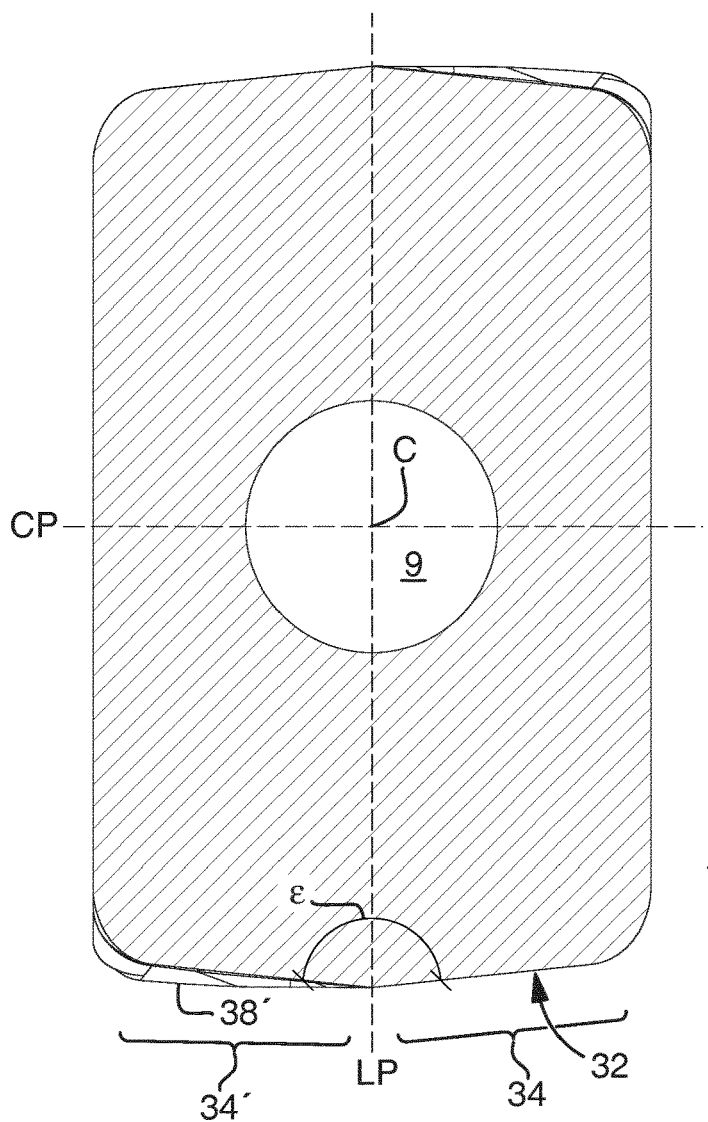
FIG. 3 shows a cross section of the cutting insert.

FIG. 3 shows a cross section of the cutting insert 2 of FIGS. 1a-1g. The cross section of FIG. 3 extends in the plane of the median plane MP. Measured in a direction in parallel with the longitudinal plane LP, in a section of the median plane MP through the cutting insert 2, i.e. in the view of FIG. 3, the cutting insert 2 is longest along the longitudinal plane LP. Seen in a direction along the second axis A2, i.e. perpendicularly to the longitudinal plane LP and toward the first side surface 10 of the first pair of opposing side surfaces 10, 11, as shown in FIG. 1f, each point of the first surface grouping 34 has a unique projection point on the longitudinal plane LP. This means that the first surface grouping 34 is arranged such that each point of the first surface grouping 34 is visible in the view along the second axis A2. In a similar manner, in a view along the second axis A2 in an opposite direction, i.e. toward the second side surface 11 of the first pair of opposing side surfaces 10, 11, each point of the second surface grouping 34' has a unique projection point on the longitudinal plane LP. This means that the second surface grouping 34' is arranged such that each point of the second surface grouping 34' is visible in the view along the second axis A2.

Thus, the cutting insert 2 is formable by MAP with a split line of a relevant pressing tool at the longitudinal plane LP. The first and second surface groupings 34, 34' may be formed in the MAP operation. Being able to position a split line of a pressing tool at the longitudinal plane LP entails that the pressing tool is uncomplex and thus, easily produced. Moreover, the split line is positioned in an area where any burrs in the insert 2 from the MAP operation will not affect the use of the cutting insert 2 to any substantial extent. In particular, burrs at the longitudinal plane LP will not affect the axial position of the cutting insert when positioned in an insert seat of a milling tool.

When manufacturing a cutting insert utilising a conventional pressing process, a powder compound is pressed between two vertical stamps into a recess of a die to form a green body, which after sintering forms a cutting insert. In MAP the powder compound in question is pressed not only between two stamps forming the first side 14 and the second side 16 of the green body to be manufactured, but also between two additional stamps, which form the circumferential surface 18 such that the part of the circumferential surface 18 which is situated on the first side of the longitudinal plan LP is formed by the first additional stamp and the other part of the circumferential surface 18 which is situated on the second side of the longitudinal plan LP is formed by the second additional stamp.

By shaping the cutting insert 2 in the manner described herein, i.e. seen in the direction along the second axis A2, with each point of the first surface grouping 34 having a unique projection point on the longitudinal plane LP, and with each point of the second surface grouping 34' having a unique projection point on the longitudinal plane LP. This means that the two stamps forming the circumferential surface 18 can be retracted in a linear path of motion from the finish-pressed green body in such a way that each point on the stamp surfaces immediately clears from the green body without scraping any surface of the same. In other words, the design of the cutting insert 2 guarantees a good surface quality, something that in turn allows manufacture of directly pressed, non-ground cutting inserts having good dimensional accuracy. Thus, the cutting insert 2 may obtain its final shape directly after pressing and sintering, and without needing to be after-treated by grinding or the like. Naturally, one or more surfaces or edges of the cutting insert 2 may be ground after sintering to meet certain tolerances or demands of edge sharpness.

The partitioning line L extends along the first side surface 12 of the second pair of opposing side surfaces 12, 13 in the longitudinal plane LP and may be said to part the first side surface 12 in two halves. In a corresponding manner, a partitioning line may extend along the second side surface 13 of the second pair of opposing side surfaces 12, 13, and may be said to part of the second side surface 13 in two halves.

The partitioning line L may form a distinct line, visible when looking at the cutting insert. That is, the first surface grouping 34 and the second surface grouping 34' may be substantially flat at the partitioning line L, and an angle difference between the first and second surface groupings 34, 34' is such that the partitioning line L forms a distinct line. Alternatively, the partitioning line L may extend e.g. along a rounded ridge forming part of and extending between the first and second surface groupings 34, 34'.

In these embodiments, the partitioning line L is a straight line, see e.g. FIG. 1e. and the partitioning line L extends perpendicularly to the median plane MP, see e.g. FIG. 1f.

In these embodiments, seen in any section in parallel with the median plane MP and through the partitioning line L, the partitioning line L extends immediately adjacent to the first axial abutment face 32 and/or to the second axial abutment face 32'. Thus, the partitioning line L is formed at an intersection between at least one of the first and second axial abutment faces 32, 32'. The partitioning line L extends also immediately adjacent to a small part of the first axial relief face 30 and a small part of the second axial relief face 30'. As the first and second axial relief faces 30, 30' are coplanar to the first axial abutment face 32 respective to the second axial abutment face 32', in the immediate vicinity of the partitioning line L, the partitioning line L is a straight line.

In the median plane MP an obtuse third inner angle $\varepsilon$ may be formed between the first surface grouping 34 and the second surface grouping 34'.

The obtuse third inner angle $\varepsilon$ may be within a range of 160-178 degrees, preferably within a range of 164-172 degrees. Mentioned purely as an example, the obtuse third inner angle $\varepsilon$ may be approximately 168 degrees in the median plane MP.

Referring e.g. to FIG. 1b, the first axial abutment face 32 forms a substantially flat surface. Similarly, the second axial abutment face 32' forms a substantially flat surface. Thus, the first and second axial abutment faces 32, 32' are particularly suited for abutting, one at a time, against an axial support surface in an insert seat of a milling tool.

The first axial abutment face 32 extends perpendicularly to the median plane MP. Similarly, the second axial abutment face 32' extends perpendicularly to the median plane MP. An exact axial positioning of the cutting insert in an insert seat of a square shoulder milling tool thus, may be achieved. As discussed above, and below with reference to the milling tool, a deviation from a target thickness of the cutting insert will affect axial runout of the cutting insert at least only to a limited extent, and in some cases not at all.

Referring e.g. to FIG. 3, seen in a view along the centre axis C on the first side of the longitudinal plane LP, for part of the cutting insert 2 which is between the median plane MP and the second side 16, the first axial abutment face 32 forms a surface of the first surface grouping 34 which is the most distant surface of the cutting insert 2 from the centre axis C. Thus, no recesses or protrusions are provided in the first surface grouping 34 between the median plane MP and the second side 16.

In a similar manner, seen in the view along the centre axis C on the second side of the longitudinal plane LP, for part of the cutting insert 2 between the median plane MP and the first side 14, the second axial abutment face 32' forms a surface of the second surface grouping 34' which is the most distant surface of the cutting insert 2 from the centre axis C.

The first axial abutment face 32 may form a substantially flat surface extending from the median plane MP towards the second side 16. Similarly, the second axial abutment face 32' may form a substantially flat surface extending from the median plane MP towards the first side 14.

The first axial abutment face 32 may form a substantially flat surface extending from the median plane MP to the second side 16. Similarly, the second axial abutment face 32' may form a substantially flat surface extending from the median plane MP to the first side 14.

Seen in the direction along the first axis A1 and projected on the central plane CP the first axial abutment face 32 may form at least 30% of the first surface grouping 34. Similarly, seen in the direction along the first axis A1 and projected on the central plane CP the second axial abutment face 32' may form at least 30% of the second surface grouping 34'.

The discussion above of the different aspects of the first and second axial abutment face 32, 32' may also relate to corresponding axial abutment faces of the second side surface 13 of the second pair of side surfaces 12, 13.

Figure 4:
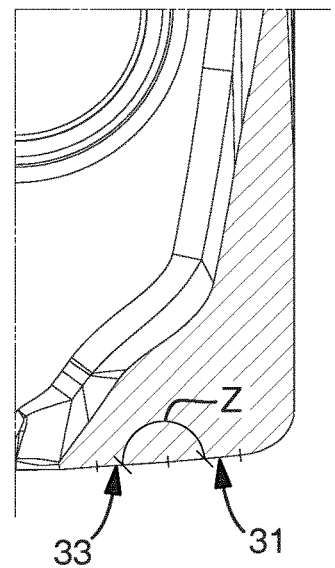
FIG. 4 shows a cross section along line IV-IV in FIG. 1e, and FIGS. 5a-5d illustrate different views of a milling tool according to embodiments.

In the following reference is made to FIGS. 1b and 1c, and to the cross section along line IV-IV in FIG. 1e shown in FIG. 4. The cross section IV-IV extends in a direction in parallel with the first axis A1. The first auxiliary cutting edge 38 comprise at least a second cutting edge part 39. The second cutting edge part 39 is arranged closer to the longitudinal plane LP than the first surface-wiping secondary cutting edge 28. The first axial relief face 30 comprises at least a second part 33. The second part 33 is arranged adjacent to the second cutting edge part 39 of the first auxiliary cutting edge 38. The second part 33 of the first axial relief face 30 create an obtuse fourth inner angle Z with the first part 31 of the first axial relief face 30. In this manner, the first and second parts of the first axial relief face do not extend in one and the same plane. The second part 33 of the first axial relief face 30 can be at least partly flat but it can be also partly curved or entirely curved surface.

In a similar manner, the second auxiliary cutting edge 38' comprises a second cutting edge part and an obtuse inner angle is created between the first part 31' and a second part of the second axial relief face 30'. The second part of the second axial relief face 30' can be at least partly flat but it can be also partly curved or entirely curved surface.

In the following reference is made to FIGS. 2-2*d*. FIGS. 2*a*-2*e* show cross sections extending in parallel with the longitudinal plane LP along lines IIa-IIa, IIb-IIb, IIc-IIc, IId-IId, and IIe-IIe respectively, in FIG. 2.

When seen in different sections in parallel with the longitudinal plane LP, such as exemplified by the cross sections of FIGS. 2*a*-2*d*, and through the first auxiliary cutting edge 38, the first axial relief face 30 forms a fifth inner angle Y in relation to the median plane MP. The fifth inner angle Y is measured adjacent to the auxiliary cutting edge 38. The fifth inner angle Y differs for at least some of the different sections in parallel with the longitudinal plane LP.

The fifth inner angle Y, at an end of the first axial relief face 30 close to the longitudinal plane LP, may be equal to or substantially equal to an inner angle of the partitioning line L to the median plane MP. Thus, in embodiments wherein the partitioning line L extends perpendicularly to the median plane MP, the fifth inner angle Y will transition from an obtuse inner angle farther way from the longitudinal plane LP to a perpendicular inner angle, or substantially perpendicular inner angle, close to the longitudinal plane LP.

Along the first surface-wiping secondary cutting edge 28 of the first auxiliary cutting edge 38 the first inner angle X and the fifth inner angle Y coincide with each other.

With reference to FIG. 2, seen in the view along the centre axis C, the first surface-wiping secondary cutting edge 28, or a tangent to the first surface-wiping secondary cutting edge in the midpoint of the first surface-wiping secondary cutting edge, extends at a sixth inner angle φ to the longitudinal plane LP, which sixth inner angle φ is 89 degrees, wherein the sixth inner angle φ is preferably larger than the half of the third inner angle ε. In this manner, the first surface-wiping secondary cutting edge will extend beyond the first axial abutment face, seen in the view along the centre axis C. Thus, when the cutting insert is arranged in an insert seat of a milling tool, preferably with no or only a small axial rake angle of the median plane, the first surface-wiping secondary cutting edge is protruding sufficiently from the first axial abutment face for cutting engagement with a workpiece. The fourth inner angle φ can also be equal to the half of the third inner angle ε.

Seen in the view along the first axis A1 towards the first side surface 12 of the second pair of opposing side surfaces 12, 13, the first axial relief face 30 has a height h in a direction parallel with the longitudinal plane LP and projected on the central plane CP, see FIG. 1*e*. The height h increases in a direction away from the longitudinal plane LP towards the first corner cutting edge 26. In this manner, the first axial relief face 30 has its largest height h in the vicinity of the first corner cutting edge 26, where normally the risk of fractures is the largest due to high loads at the corner cutting edge. The large height h towards the corner cutting edge 26 means stress concentration in a transition from the axial relief face 30 to the axial support surface 32 is formed at a distance from the corner cutting edge 26. At the same time, the smaller height h towards the longitudinal plane makes it easier to obtain a simplified partitioning line L which in its turn simplifies the pressing tool.

Seen in the view along the first axis A1 towards the first side surface 12 of the second pair of opposing side surfaces 12, 13, the first axial relief face 30 is adjacent to the first corner surface and preferably tangentially connected to the first corner surface, see FIG. 1*e*. Also, the second axial relief face 30' is adjacent to the second corner surface and preferably tangentially connected to the second corner surface. The first axial relief face 30 is arranged such that a distance from the median plane MP to the first axial relief face 30 increases in a direction away from the first corner face toward the longitudinal plane LP. Thanks to this, the first axial abutment face 32 can be enlarged which gives possibility to improved stability of the insert but which also simplifies the area around the partitioning line L where the first surface grouping 34 meets the second surface grouping 34' which simplifies the pressing tool which in its turn contributes to improved tolerances of the insert. Also, a simplified partitioning line L is achieved. Also, the second axial relief face 30' is arranged such that a distance from the median plane MP to the second axial relief face 30' increases in a direction away from the second corner surface toward the longitudinal plane. Thanks to this, the second axial abutment face 32' can be enlarged which gives possibility to improved stability of the insert but which also simplifies the area around the partitioning line L where the first surface grouping 34 meets the third second grouping 34' and simplifies the partitioning line L. A third axial relief face and a fourth axial relief face, comprised in the second side surface 13 of the second pair of opposing side surfaces 12, 13, can be arranged in the same manner.

With reference to FIG. 1*e*, seen in the view along the first axis A1, the first surface-wiping secondary cutting edge 28, or a tangent to the first surface-wiping secondary cutting edge in the midpoint of the first surface-wiping secondary cutting edge, extends a seventh sharp angle λ to the median plane MP, such that a first end of the first surface-wiping secondary cutting edge 28 adjacent to the first corner cutting edge 26 is situated at a greater distance from the median plane MP than the opposite end of the first surface-wiping secondary cutting edge 28 adjacent to the second cutting edge part 39 of the first auxiliary cutting edge 38. The seventh angle λ is greater than 0 degrees, or preferably 15°≤λ≤25°.

FIGS. 5*a*-5*d* illustrate different views of a milling tool 40 according to embodiments. The milling tool 40 is a square shoulder milling tool. The milling tool 40 is configured to be rotated about a rotation axis 42. The milling tool comprises a tool body 44. The tool body 44 at a first axial end portion 45 thereof is provided with an insert seat 46 for receiving a cutting insert 2. In these embodiments the tool body 44 is provided with six insert seats 46. According to alternative embodiments, inter alia depending on a diameter of the tool body, the tool body may be provided with less or more than six insert seats. A smaller diameter tool body may for instance be provided with two insert seats. Whereas a larger diameter tool body may be provided with ten, twelve, or more insert seats.

The milling tool 40 is configured to comprises a cutting insert 2 according to any one of aspects and/or embodiments discussed herein arranged in one or each of the insert seats 46. For the sake of clarity, cutting inserts have been omitted in some of the insert seats 46 in FIGS. 5a and 5b. In these embodiments, the cutting insert 2 is secured to the tool body 44 with a screw 47 extending through the through hole 9 of the cutting insert 2. The screw 47 co-operates with a threaded hole in the milling tool at the insert seat.

Each of the insert seats 46 is provided with a tangential support surface 52, a radial support surface 54, and an axial support surface 56. The axial support surface 56 extends perpendicularly or substantially perpendicularly to the tangential support surface 52. In these embodiments, the radial support surface 54 comprises two separate surface portions arranged at a distance from each other.

When positioned in the insert seat 46, the cutting insert 2 is arranged with a portion of the second side 16 abutting against the tangential support surface 52, a portion of the first or second side surface 10, 11 of the first pair of opposing side surfaces 10, 11 abutting against the radial support surface 54, and a portion of the first or second side surface 12, 13 of the second pair of opposing side surfaces 12, 13 abutting against the axial support surface 56.

Figure 5A:
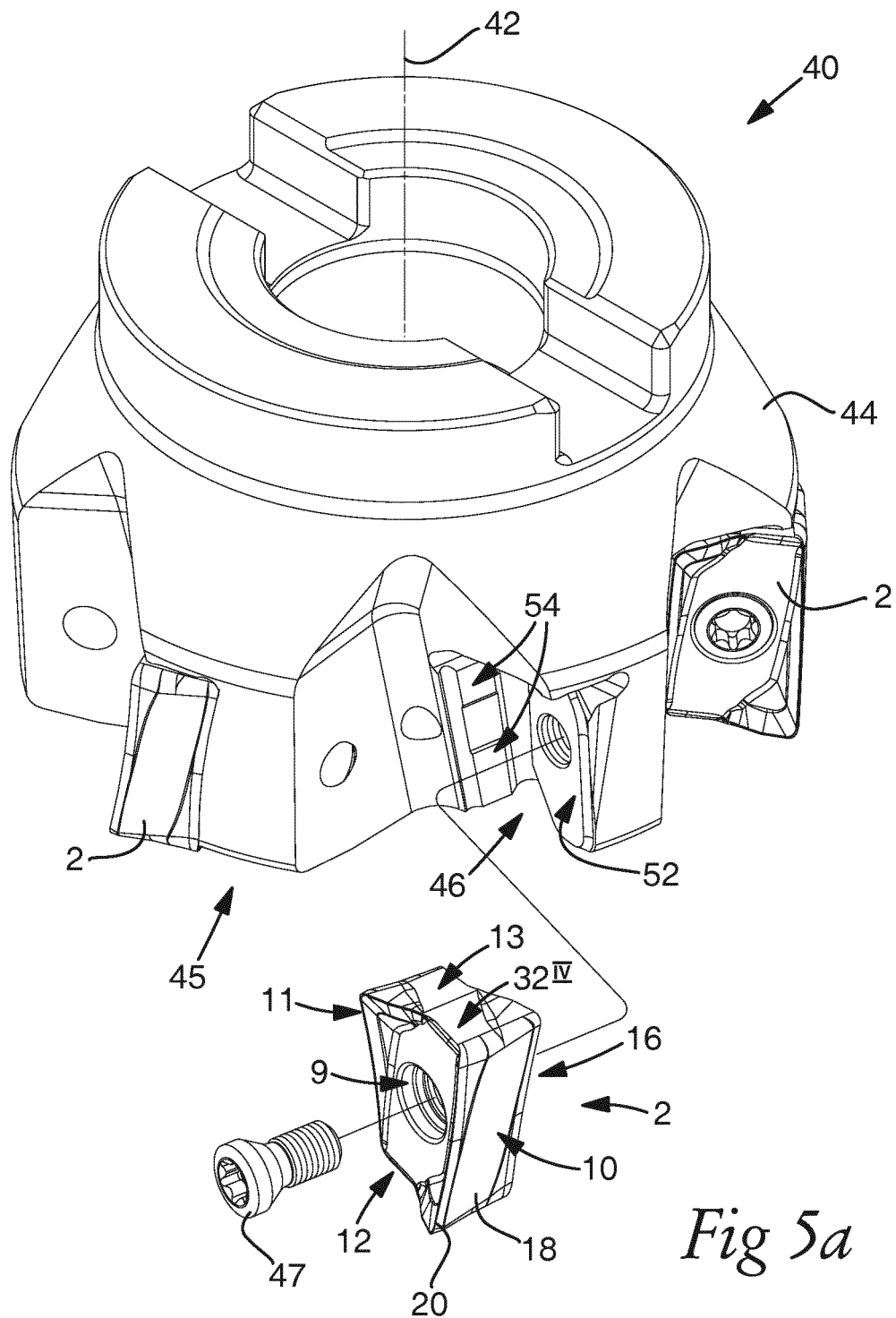
Figure 5B:
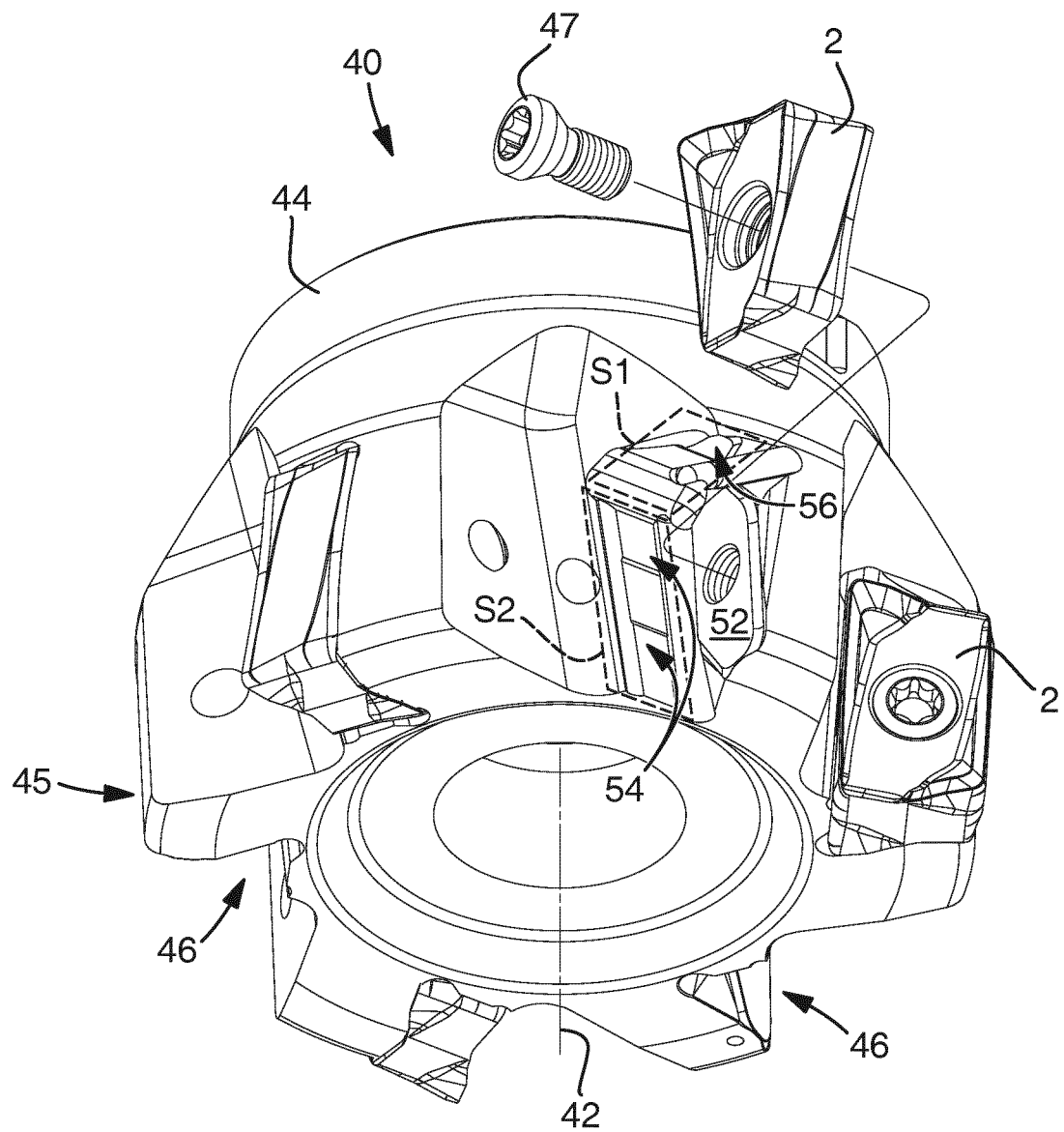

An axial abutment face $32^{IV}$ abuts against the axial support surface 56. The axial support surface 56 in the insert seat 46 need not abut against the entire axial abutment face $32^{IV}$ of the cutting insert 2. In FIG. 5a the shown axial abutment face $32^{IV}$ forms a fourth axial abutment face $32^{IV}$, which forms part of a fourth surface grouping adjacent to the fourth cutting edge 23' of the cutting insert 2. When the first cutting edge 20 is positioned for cutting engagement with a workpiece, as indicated in FIG. 5a, the fourth axial abutment face $32^{IV}$ abuts against the axial support surface 56.

The axial support surface 56 extends in a first support plane S1. The first support plane S1 crosses the rotation axis 42 on a side of the insert seat 46 opposite to the first axial end portion 45. Thus, the axial support surface 56 leans towards the first axial end portion 45 towards a radially outer portion of the insert seat 46. This entails that an axial force applied to the cutting insert 2 during a milling operation provides a radial force component at the axial support surface 56 pushing the cutting insert 2 radially inwardly into the insert seat 46.

The radial abutment face 25 of the one of the first and second side surfaces 10, 11 of the first pair of opposing side surfaces 10, 11 of the cutting insert 2, see FIG. 1c, is configured to abut against the radial support surface 54. The radial support surface 54 extends in a second support plane S2, wherein the second support plane S2 crosses the rotation axis 42 on a same side of the insert seat 46 as the first axial end portion 45. Thus, the radial support surface 54 leans towards the rotation axis 42 at an axially outer end of the insert seat 46. This may be advantageous in embodiments of the cutting insert 2 discussed above, wherein seen in the view along the centre axis C, at least part of the first radial relief face 50 extends outside of the first main cutting edge 24 at least along a part of the first main cutting edge 24 such that the first radial relief face 50 extends more outside the first main cutting edge 24 towards a second end 29 of the main cutting edge 24 than towards the first end 27 of the main cutting edge 24. Accordingly, the first main cutting edge 24 of the cutting insert 2 is positioned to extend substantially in parallel with the rotation axis 42 of the milling tool 40.

Figure 5C:
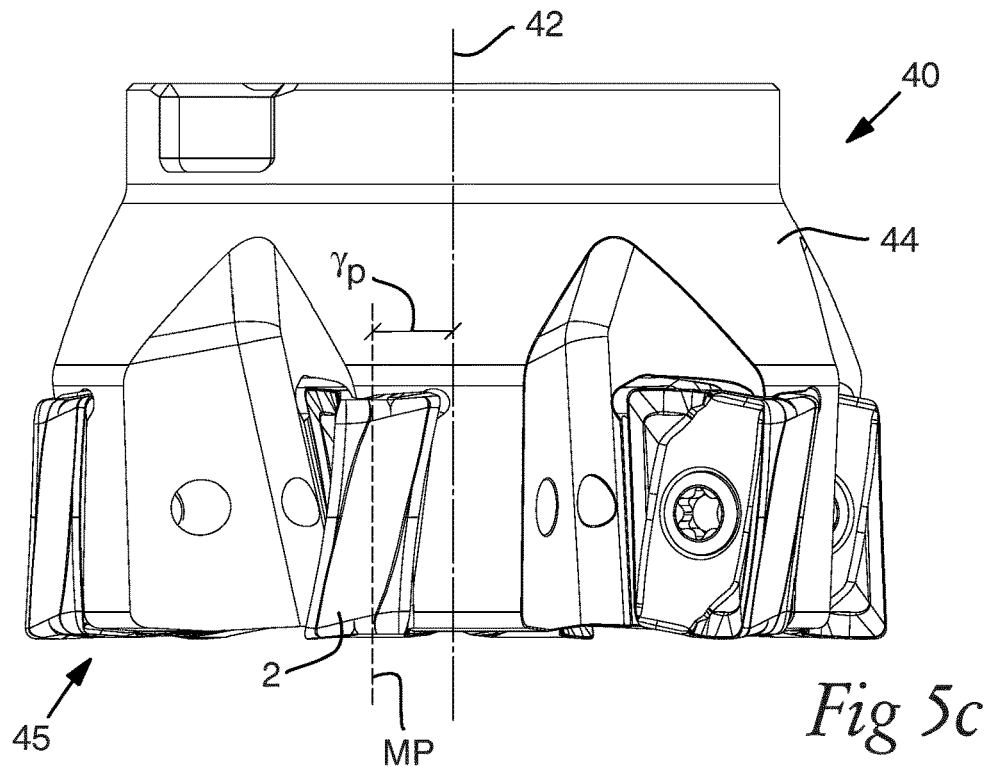

The insert seat 46 is configured to provide an axial rake angle γp for the median plane MP of the cutting insert 2 arranged in the insert seat 46, see FIG. 5c. The insert seat 46 is configured to provide an axial rake angle γp equal to 0 degrees or a negative axial rake angle (γp) having an absolute value within a range of 0<|γp|≤3 degrees, or within a range of 0.5≤|γp|≤2 degrees, or of approximately 1 degree. Thus, the cutting insert 2 is neutrally or only marginally tilted in an axial direction of the milling tool 40. Thus, a deviation from a target thickness of the cutting insert 2, i.e. in a direction along the centre axis C of the cutting insert 2, will not affect axial runout of the cutting insert 2, or at least will affect axial throw/runout only to a limited extent.

Figure 5D:
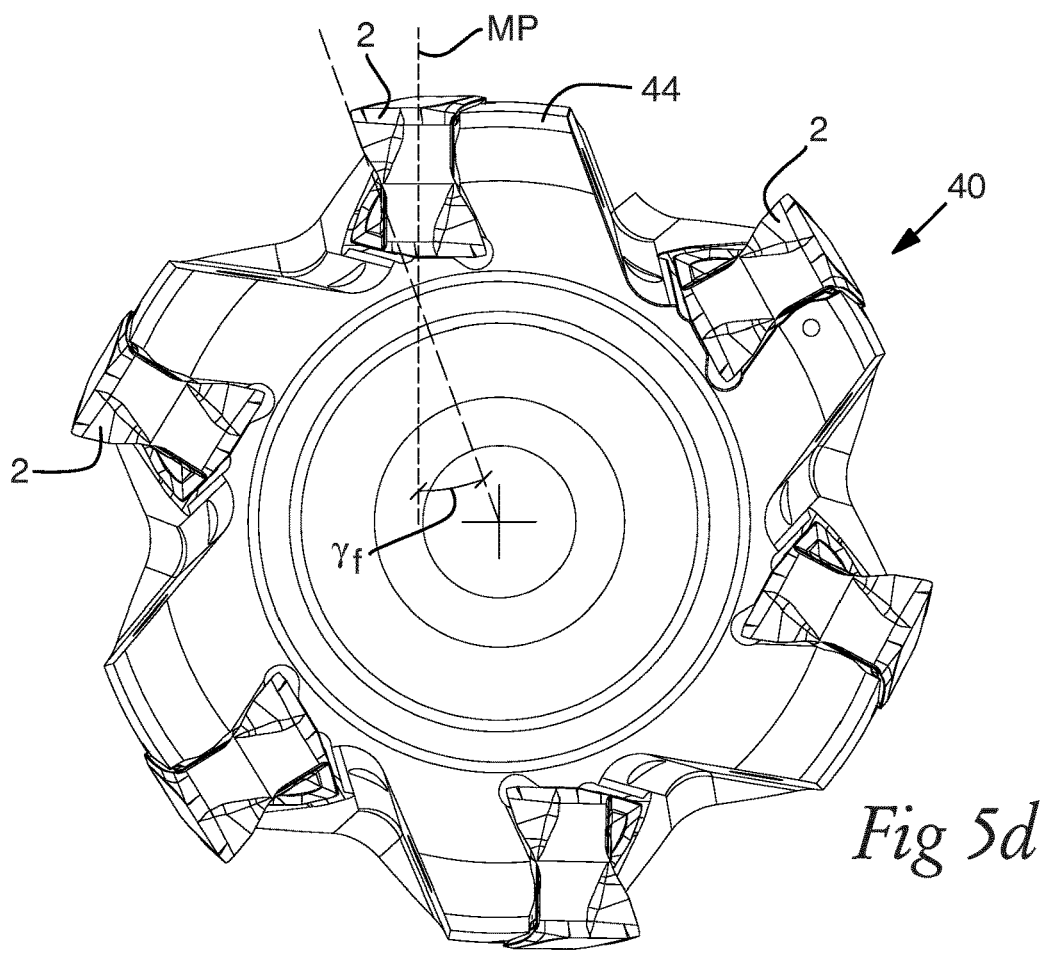

The insert seat 46 is configured to provide a negative radial rake angle γf for the median plane MP of the cutting insert 2 arranged in the insert seat 46, see FIG. 5d. The insert seat 46 is configured to provide a negative radial rake angle γf having an absolute value within a range of 10≤|γf|≤30 degrees, or within a range of 15≤|γf|≤25 degrees. In this manner, a functional positive relief angle of the main cutting edge of the first cutting edge 20 may be formed by the radial rake angle γf. The tool shown in FIGS. 5a-5c has a negative radial rake angle γf having an absolute value of 20 degrees.

Namely, as discussed above, in embodiments, wherein seen in the view along the centre axis C, at least part of the first radial relief face 50 extends outside of the first main cutting edge 24 at least along a part of the first main cutting edge 24, the radial rake angle γf provides for a positive functional relief angle when the cutting insert 2 is positioned in the insert seat 46.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A cutting insert for a milling tool, the cutting insert comprising:
   a first side defining a first extension plane;
   a second side opposite the first side, the second side defining a second extension plane, wherein a centre axis extends perpendicularly through the first and second extension planes;
   a circumferential surface extending between the first side and the second side, the circumferential surface including a first pair of opposing side surfaces and a second pair of opposing side surfaces;
   a median plane extending halfway between the first extension plane and the second extension plane;
   a longitudinal plane extending halfway between the first pair of opposing side surfaces, perpendicularly to the median plane and containing the centre axis;
   a central plane extending perpendicularly to both the median plane and the longitudinal plane and containing the centre axis;
   a first axis extending along an intersection between the median plane and the longitudinal plane and a second axis extending along an intersection between the median plane and the central plane;
   a first cutting edge extending along an intersection between the first side and the circumferential surface on a first side of the longitudinal plane, the first cutting edge, as seen in a view towards the first side, extending along a first corner of the cutting insert; and
   a second cutting edge extending along an intersection between the second side and the circumferential surface on a second side of the longitudinal plane, the second cutting edge, as seen in a view towards the second side, extending along a second corner of the cutting insert, wherein the first cutting edge includes a first main cutting edge, a first corner cutting edge, and a first auxiliary cutting edge, the first auxiliary cutting edge having a first surface-wiping secondary cutting edge, wherein the first main cutting edge adjoins the first corner cutting edge, and the first corner cutting edge adjoins the first surface-wiping secondary cutting edge, wherein the second cutting edge includes a second main cutting edge, a second corner cutting edge, and a second auxiliary cutting edge, the second auxiliary cutting edge having a second surface-wiping secondary cutting edge, wherein the second main cutting edge adjoins the second corner cutting edge, and the second corner cutting edge adjoins the second surface-wiping secondary cutting edge, and as seen in a direction along the first axis, a first axial relief face adjacent to the first auxiliary cutting edge and a first axial abutment face form part of a first surface grouping on the first side of the longitudinal plane, and a second axial relief face adjacent to the second auxiliary cutting edge and a second axial abutment face form part of a second surface grouping on the second side of the longitudinal plane, wherein the first axial relief face includes a first part of the first axial relief face adjacent to the first surface-wiping secondary cutting edge, and the second axial relief face includes a first part of the second axial relief face adjacent to the second surface-wiping secondary cutting edge, at least the first part of the first axial relief face forming an obtuse first inner angle with the median plane when seen in a section parallel to the longitudinal plane, and at least the first part of second axial relief face forming an obtuse second inner angle with the median plane when seen in a section parallel to the longitudinal plane, wherein the first surface grouping and the second surface grouping form part of the circumferential surface, wherein the insert has 180° rotational symmetry with respect to rotation about the second axis and/or the first axis and/or the centre axis, wherein as measured in a direction in parallel with the longitudinal plane, in a section of the median plane through the cutting insert, the cutting insert is longest along the longitudinal plane, wherein as seen in a direction along the second axis, each point of the first surface grouping has a unique projection point on the longitudinal plane, and wherein as seen in a direction along the second axis in an opposite direction, each point of the second surface grouping has a unique projection point on the longitudinal plane, wherein the first surface grouping and the second surface grouping meet in a partitioning line, wherein the partitioning line extends in the longitudinal plane from the first side to the second side.

2. The cutting insert according to claim 1, wherein the partitioning line is a straight line.

3. The cutting insert according to claim 1, wherein the partitioning line extends perpendicularly to the median plane.

4. The cutting insert according to claim 1, wherein as seen in the median plane an obtuse third inner angle is formed between the first surface grouping and the second surface grouping.

5. The cutting insert according to claim 1, wherein the first axial abutment face forms a substantially flat surface.

6. The cutting insert according to claim 5, wherein the first axial abutment face extends perpendicularly to the median plane.

7. The cutting insert according to claim 1, wherein the first axial abutment face forms a substantially flat surface extending from the median plane towards the second side.

8. The cutting insert according to claim 1, wherein the first axial abutment face forms a substantially flat surface extending from the median plane to the second side.

9. The cutting insert according to claim 1, wherein as seen in the direction along the first axis and projected on the central plane, the first axial abutment face forms at least 30% of the first surface grouping.

10. The cutting insert according to claim 4, wherein the first auxiliary cutting edge includes at least a second cutting edge part of the first auxiliary cutting edge, said second cutting edge part being closer to the longitudinal plane than the first surface-wiping secondary cutting edge, the first axial relief face including at least a second part of the first axial relief face, said second part being adjacent to the second cutting edge part of the first auxiliary cutting edge, wherein said second part of the first axial relief face creates an obtuse fourth inner angle with the first part of the first axial relief face.

11. The cutting insert according to claim 10, wherein when seen in different sections in parallel with the longitudinal plane and through the first auxiliary cutting edge, in each of said different sections in parallel with the longitudinal plane the first axial relief face forms a fifth inner angle in relation to the median plane measured adjacent to the auxiliary cutting edge, and wherein the fifth inner angle differs for at least some of said different sections in parallel with the longitudinal plane.

12. The cutting insert according to claim 11, wherein the fifth inner angle at an end of the first axial relief face closest to the longitudinal plane is equal to or substantially equal to an inner angle of the partitioning line to the median plane.

13. The cutting insert according to claim 1, wherein as seen in any section through the partitioning line and in parallel with the median plane, the partitioning line extends immediately adjacent to the first axial abutment face and/or the second axial abutment face.

14. The cutting insert according to claim 1, wherein as seen in a view along the centre axis on the first side of the longitudinal plane, for part of the cutting insert, which is between the median plane and the second side, the first axial abutment face forms a surface of the first surface grouping, which is the most distant surface of the cutting insert from the centre axis.

15. A milling tool configured to be rotated about a rotation axis comprising:
   a tool body, wherein the tool body at a first axial end portion thereof is provided with an insert seat for receiving a cutting insert; and
   a cutting insert according to claim 1 arranged in the insert seat.

16. The milling tool according to claim 15, wherein the insert seat is provided with a tangential support surface, a radial support surface, and an axial support surface.

17. The milling tool according to claim 16, wherein the axial support surface extends perpendicularly or substantially perpendicularly to the tangential support surface.

18. The milling tool according to claim 16, wherein the axial support surface extends in a first support plane, and wherein the first support plane crosses the rotation axis on a side of the insert seat opposite to the first axial end portion.

19. The milling tool according to claim 16, wherein the radial support surface extends in a second support plane, and wherein the second support plane crosses the rotation axis on a same side of the insert seat as the first axial end portion.

20. The milling tool according to claim 16, wherein the cutting insert is arranged with a portion of the second side abutting against the tangential support surface, a portion of the circumferential surface abutting against the radial support surface, and the first axial abutment face abutting against the axial support surface.

21. The milling tool according to claim 16, wherein the insert seat is configured to provide an axial rake angle ($\gamma p$) for the median plane of the cutting insert arranged in the insert seat, and wherein the insert seat is configured to provide an axial rake angle ($\gamma p$) equal to 0 degrees or a negative axial rake angle ($\gamma p$) having an absolute value within a range of $0 < |\gamma p| \leq 3$ degrees.

22. The milling tool according to claim 15, wherein the insert seat is configured to provide a negative radial rake angle ($\gamma f$) for the median plane of the cutting insert arranged in the insert seat, and wherein the insert seat is configured to provide a negative radial rake angle ($\gamma f$) having an absolute value within a range of $10 \leq |\gamma f| \leq 3$ degrees.

* * * * *